(12) United States Patent
Hay et al.

(10) Patent No.: US 6,213,289 B1
(45) Date of Patent: Apr. 10, 2001

(54) MULTIPLE CHANNEL SYSTEM, APPARATUS AND METHOD FOR TRANSPORTING PARTICULATE MATERIAL

(75) Inventors: Andrew G. Hay, Marina del Rey; Roger L. Peterson, Los Angeles, both of CA (US)

(73) Assignee: Stamet, Incorporation, Gardena, CA (US)

( * ) Notice: Subject to any disclaimer, the term of this patent is extended or adjusted under 35 U.S.C. 154(b) by 0 days.

(21) Appl. No.: 09/129,714

(22) Filed: Aug. 5, 1998

Related U.S. Application Data

(60) Provisional application No. 60/066,491, filed on Nov. 24, 1997.

(51) Int. Cl.[7] ................................................. B65G 31/04
(52) U.S. Cl. ........................... 198/642; 415/90; 406/96; 406/99
(58) Field of Search .................................... 198/642, 723; 415/90; 406/52, 71, 96, 99

(56) References Cited

U.S. PATENT DOCUMENTS

| | | |
|---|---|---|
| 1,489,571 | 4/1924 | Wright . |
| 1,668,183 | 5/1928 | Albrecht . |
| 2,045,081 | 6/1936 | Hart . |
| 2,081,182 | 5/1937 | Malke et al. . |
| 2,196,390 | 4/1940 | Gates . |
| 2,205,902 | 6/1940 | McMahan . |
| 2,210,505 | 8/1940 | Sinden . |
| 2,318,881 | 5/1943 | Mundy . |
| 2,427,659 | 9/1947 | Collyer . |
| 2,568,536 | 9/1951 | Beech . |
| 2,622,722 | 12/1952 | Lucas . |
| 2,626,571 | 1/1953 | Hoenecke . |
| 2,637,375 | 5/1953 | Tapp et al. . |
| 2,684,868 | 7/1954 | Berg . |
| 2,684,870 | 7/1954 | Berg . |
| 2,684,872 | 7/1954 | Berg . |
| 2,684,873 | 7/1954 | Berg . |
| 2,712,412 | 7/1955 | West . |

(List continued on next page.)

FOREIGN PATENT DOCUMENTS

| | | |
|---|---|---|
| 725 012 | 2/1932 | (FR) . |
| 1 220 175 | 2/1968 | (GB) . |
| 1 379 075 | 1/1972 | (GB) . |
| WO 80/00472 | 4/1980 | (WO) . |

OTHER PUBLICATIONS

"Introducing Vibratory Machines for Material Handling", Kinergy Corporation, Louisville, KY, Bulletin No. 1MH–1, May 1994; 24 pages.

Primary Examiner—Joseph E. Valenza
(74) Attorney, Agent, or Firm—Foley & Lardner

(57) ABSTRACT

An apparatus for transporting particulate material includes a housing having an inlet for receiving particulate material and an outlet through which particulate material is discharged in a moving dynamic mass. A rotor is supported for rotation within the housing, adjacent a stationary glide surface. The rotor has a plurality of disks spaced apart by hub sections and defining a plurality of transport channels between the disks, adjacent the glide surface. Each transport channel extends between the inlet and the outlet. The rotor is rotated while particulate material is fed into the housing inlet. The particulate material is received within the transport channels and, by the action of the rotating disks and the stationary glide surface, the particulate material in each of the transport channels interlocks with the disk walls and bridges across transport channel. The material is transported by the motion of the disk walls and, at the same time, forms a moving dynamic mass. The moving dynamic mass from each transport channel is conveyed out of the outlet of the housing.

30 Claims, 15 Drawing Sheets

U.S. PATENT DOCUMENTS

| | | |
|---|---|---|
| 2,843,047 | 7/1958 | Korber . |
| 2,868,351 | 1/1959 | Hegmann . |
| 3,086,696 | 4/1963 | Hein-Geldern . |
| 3,150,815 | 9/1964 | Laing . |
| 3,592,394 | 7/1971 | Sinden . |
| 3,643,516 | 2/1972 | Jacobson . |
| 3,765,216 | 10/1973 | Green . |
| 3,889,588 | 6/1975 | Wollersheim . |
| 4,023,784 | 5/1977 | Wallace . |
| 4,032,254 | 6/1977 | Bentz et al. . |
| 4,043,445 | 8/1977 | Wirth et al. . |
| 4,076,460 | 2/1978 | Roof . |
| 4,177,005 | 12/1979 | Bozung et al. . |
| 4,193,737 | 3/1980 | Lemmon . |
| 4,213,709 * | 7/1980 | Valsamis ................................ 415/90 |
| 4,274,527 | 6/1981 | Baker . |
| 4,335,994 | 6/1982 | Gurth . |
| 4,409,746 | 10/1983 | Beck . |
| 4,421,412 * | 12/1983 | Hold et al. .............................. 415/90 |
| 4,516,674 | 5/1985 | Firth . |
| 4,597,491 | 7/1986 | Conklin . |
| 4,616,961 | 10/1986 | Burrough et al. . |
| 4,678,076 | 7/1987 | Nenakhov et al. . |
| 4,768,920 | 9/1988 | Gurth . |
| 4,773,819 | 9/1988 | Gurth . |
| 4,832,554 | 5/1989 | Gaskin . |
| 4,964,502 * | 10/1990 | Buschbom ........................... 198/642 |
| 4,972,970 | 11/1990 | Toerner . |
| 4,988,239 | 1/1991 | Firth . |
| 5,051,041 | 9/1991 | Firth . |
| 5,137,220 | 8/1992 | Rose et al. . |
| 5,355,993 | 10/1994 | Hay . |
| 5,356,280 | 10/1994 | Pnozielli . |
| 5,381,886 | 1/1995 | Hay . |
| 5,497,873 | 3/1996 | Hay . |
| 5,551,553 | 9/1996 | Hay . |

* cited by examiner

MULTIPLE CHANNEL SYSTEM, APPARATUS AND METHOD FOR TRANSPORTING PARTICULATE MATERIAL

RELATED APPLICATION

This invention relates to Provisional Application Ser. No. 060/066,491, filed Nov. 24, 1997, the contents of which are incorporated by reference herein.

BACKGROUND OF THE INVENTION

1. Field of the Invention

The present invention relates generally to systems, apparatuses and methods for transporting and metering particulate material and, in preferred embodiments, to such a system, apparatus and method which employs multiple transport channels formed, in preferred embodiments, between three or more disks.

2. Description of Related Art

A wide variety of equipment has been used to either transport or meter particulate material (such as, but not limited to, coal, other mined materials, chemicals, dry food products, other dry goods handled in solid, particle form). Such transport equipment includes conveyor belts, rotary valves, lock hoppers, screw-type feeders, etc. Exemplary measurement or metering devices include weigh belts, gravametric and volumetric hoppers and the like. In order to provide both transport and metering of particulate material, it was typically necessary to use or combine both types of devices into a system.

However, applicant's earlier developments resulted in particulate transport devices which included the capability of both transporting and metering particulate material. Examples of such prior devices include the rotary disk type pumps discussed in the following U.S. patents, each of which is assigned or licensed to the assignee of present invention and each of which is incorporated herein by reference: U.S. Pat. No. 4,516,674 (issued May 14, 1985); U.S. Pat. No. 4,988,239 (issued Jan. 29, 1991); and U.S. Pat. No. 5,051,041 (issued Sep. 24, 1991); U.S. Pat. No. 5,355, 993 (issued Oct. 28, 1994); U.S. Pat. No. 5,381,886 (issued Jan. 17, 1995); U.S. Pat. No. 5,485,909 (issued Jan. 23, 1996); U.S. Pat. No. 5,497,873 (issued Mar. 12, 1996); U.S. Pat. No. 5,551,553 (issued Sep. 3, 1996). Improvements, with respect to apparatuses described in the above-cited patents, for transporting and metering particulate material across a pressure differential (such as into a pressurized system environment) arc described in U.S. Pat. No. 5,402, 976 (issued in Apr. 4, 1995), which is assigned to the assignee of the present invention and which is incorporated herein by reference.

According to the above-cited patents, particulate material may be transported and metered through a transport apparatus having a transport duct defined by at least one moving drive surface and a stationary surface. Embodiments illustrated in those patents include two moving surfaces defined by two rotary disks arranged coaxial and spaced from each other. An example of a two-disk apparatus as described in at least some of the above-cited patents is shown in prior art FIGS. 1 and 2 herein, wherein the apparatus 10 includes a housing 12 having an inlet 14, an outlet 16 and a drive rotor 18. The drive rotor 18 is composed of a hub 34 and a pair of disks 26 and 28. FIGS. 1 and 2 herein are substantially similar to FIGS. 1 and 2 of U.S. Pat. No. 5,402,876, cited above.

The drive rotor 18 (and, thus, the pair of disks 26 and 28) are mounted on a shaft 20, which is mounted for rotation relative to the housing and is coupled to a motor (not shown) for rotation in the direction of arrow 24. A transport channel is defined within the space between the opposing faces 36 and 38 of the disks 26 and 28, and is bounded on the inner and outer diameters of the disk faces by hub 34 and stationary inner walls 44 and 46 in the housing. As described in the above-cited patents, when the rotor 18 is driven in the direction of arrow 24, the disk faces 36 and 38 define moving drive surfaces which, in combination with the stationary surfaces of walls 44 and 46, act on the particles to cause the particles to inter-lock and bridge across the transport channel.

As the particles interlock with each other and bridge across the transport channel, the outermost particles engage the drive walls, such that drive force is transferred from the drive walls to the interlocked mass of particles. This interlocking and bridging action provides, in effect, a compacted transient solid spanning the width of the channel. Moreover, as a result of the drive force imparted by the drive walls, the transient solid of interlocked particles forms a moving dynamic mass, driven out of the outlet of the apparatus.

Two-disk transport apparatuses such as described above have proven to be capable of transporting and metering a variety of particulate materials that had previously been relatively difficult to efficiently transport and meter, including coal particles of varying sizes, grains having relatively low mass, sand, various chemicals, and chemical and mineral process feedstocks. Furthermore, because the moving dynamic mass of particulate material effectively fills the transport channel as it is moved out from the outlet of such apparatuses, the rate at which particulate material is transported out of the apparatus (the through-put of the apparatus) is a function of the cross-sectional area of the transport channel at the outlet and the rotation speed of the disks. Other factors, such as the bulk density of the material being transported also affect the transport rate. Thus, for a given material, channel cross-sectional area, and disk rotation speed, the feed rate of such an apparatus may be determined. In addition, feed rates of such apparatuses can typically be regulated, to some extent, by controlling and varying the disk rotation speed.

However, in various operational environments, the maximum speed by which the disks can be rotated may be limited, for example, by the capabilities of the available drive motor or transmission linkage, the type of material being transported, or other operational or environmental factors. Therefore, in such environments, greater transportation rates (through-put) traditionally required larger transport channels and, thus, larger disks. For example, disks as large as 60 inches in diameter have been used in two-disk transport apparatuses to meet feed rate requirements as high as 70 tons per hour, for a coal-fired power plant furnace.

The maximum size (diameter) of the disks may be limited by other operational and environmental constraints, for example, available space, weight handling capabilities, cost, safety or other factors. In addition, metering precision can be more difficult to control with a larger transport channel (disk diameter). Larger transport channels have a greater tendency to produce avalanching or cascading effects (surging and ebbing of the feed rate) at the outlet, instead of feeding out at a uniform feed rate.

An alternative to increasing the transport channel dimension (disk diameter) was noted by Donald Firth (inventor of the above-cited U.S. Pat. No. 4,988,239). More specifically, while preferred embodiments of the apparatus shown in the above-cited '239 patent employ a single drive rotor having two disks, Dr. Firth noted that "it is also possible to provide transport apparatus having multiple drive rotors which receive material from a single or multiple inlets" to provide "increased material through-put withou [sic] having to increase the diameter of the rotor disk" (column 7, lines 23–29 of the '239 patent). Similar statements are made in the above-cited '876 patent, at column 11, lines 36–42. With reference to FIG. 2 of the '239 patent, Dr. Firth illustrated a drive rotor composed of two disks (26 and 28), where each disk includes a section of the hub (34). Similarly, a drive rotor is illustrated in FIG. 2 of the '876 patent as having two disks separated by a hub.

SUMMARY OF THE DISCLOSURE

Accordingly, the present disclosure relates to preferred embodiments and improvements of transport apparatuses having more than one transport channels, and systems and methods employing the same.

According to a preferred embodiment, an apparatus for transporting particulate material includes a housing having an inlet for receiving particulate material and an outlet through which particulate material is discharged in a moving dynamic mass. A rotor is supported for rotation within the housing, adjacent a stationary glide surface. The rotor has a plurality of disks spaced apart by hub sections and defining a plurality of transport channels between the disks, adjacent the glide surface. Each transport channel extends between the inlet and the outlet. The rotor is rotated while particulate material is fed into the housing inlet. The particulate material is received within the transport channels and, by the action of the rotating disks and the stationary glide surface, the particulate material in each of the transport channels interlocks with the disk walls and bridges across transport channel. The material is transported by the motion of the disk walls, as a moving dynamic mass. The moving dynamic mass from each transport channel is conveyed out of the outlet of the housing.

The rotor configuration may be provided with mechanisms for allowing the relative spacings of disks to be selected and adjusted. The inlet and outlet configurations of the housing may be provided with frame portions or barriers that align with disks on the rotor, to provide separate inlet or outlet paths to the separate channels defined by the rotor. In a preferred embodiment, the housing is configured to accommodate any one of a plurality of rotors, each having different disk spacings and, thus, different channel widths.

The above discussed features and many other features and attendant advantages of the present invention will become better understood by reference to the following detailed description when considered in conjunction with the accompanying drawings.

BRIEF DESCRIPTION OF THE DRAWINGS

The detailed description will be made with reference to the accompanying drawings, wherein like numerals designate corresponding parts in the several figures.

DETAILED DESCRIPTION OF THE PREFERRED EMBODIMENTS

The following detailed description is of the best presently contemplated mode of carrying out the invention. This description is not to be taken in a limiting sense, but is made merely for the purpose of illustrating general principles of embodiments of the invention. The scope of the invention is best defined by the appended claims.

The present invention relates generally to systems, apparatuses and methods for transporting and metering particulate material employing rotary disk principles such as described in the above-cited patents, and further employing multiple transport channels between three or more disk surfaces. According to example embodiments described herein, a transport or feeding apparatus comprises a housing having an inlet and an outlet and an interior which contains a drive rotor mounted for rotation relative to the housing. The side view of the apparatus may appear, for example, similar to the side view of the prior art apparatus shown in FIG. 1. However, unlike the prior art apparatus of FIG. 1, in preferred embodiments of the present invention the drive rotor defines a plurality of transport channels between four or more drive surfaces, for example, defined by three or more disks. Furthermore, the housing has an inlet configured to feed particulate material to the plurality of transport channels and an outlet configured to discharge particulate material from the plurality of transport channels.

Further example embodiments employ inlet configurations for controlling the flow of input particulate material such that different materials or different particle sizes are fed to respectively different transport channels of the rotor. Further example embodiments employ outlet configurations having multiple outlet openings corresponding to the multiple transport channels of the rotor. Yet further example embodiments employ transport channels having differing widths, where the channel widths are selected to provide a prescribed mixture of different materials or different particle sizes transported in different channels. In yet further example embodiments, the transport channel widths are selectable and variable.

Figure 1:
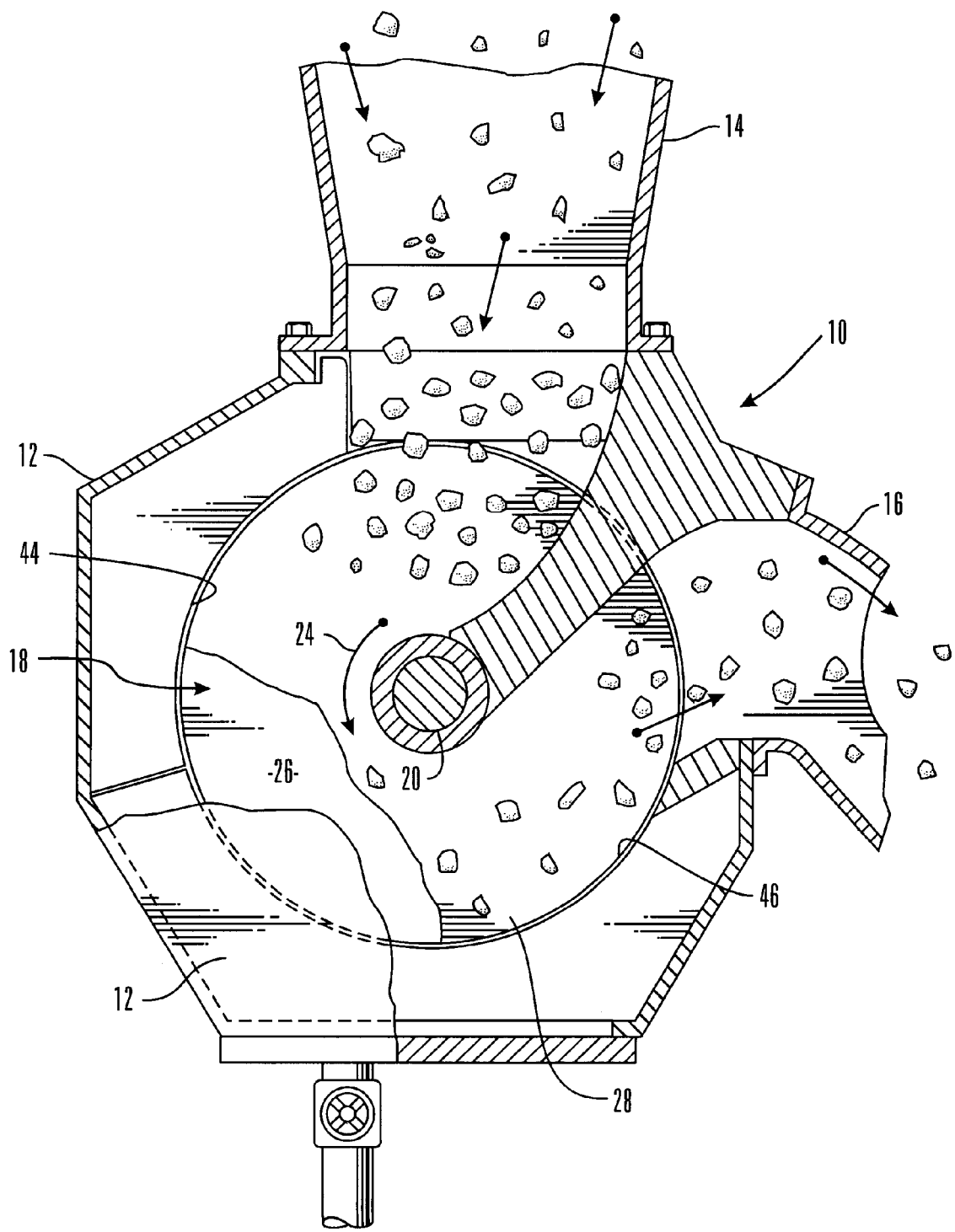
FIG. 1 is a sectional side view of a prior art transport apparatus.
Figure 2:
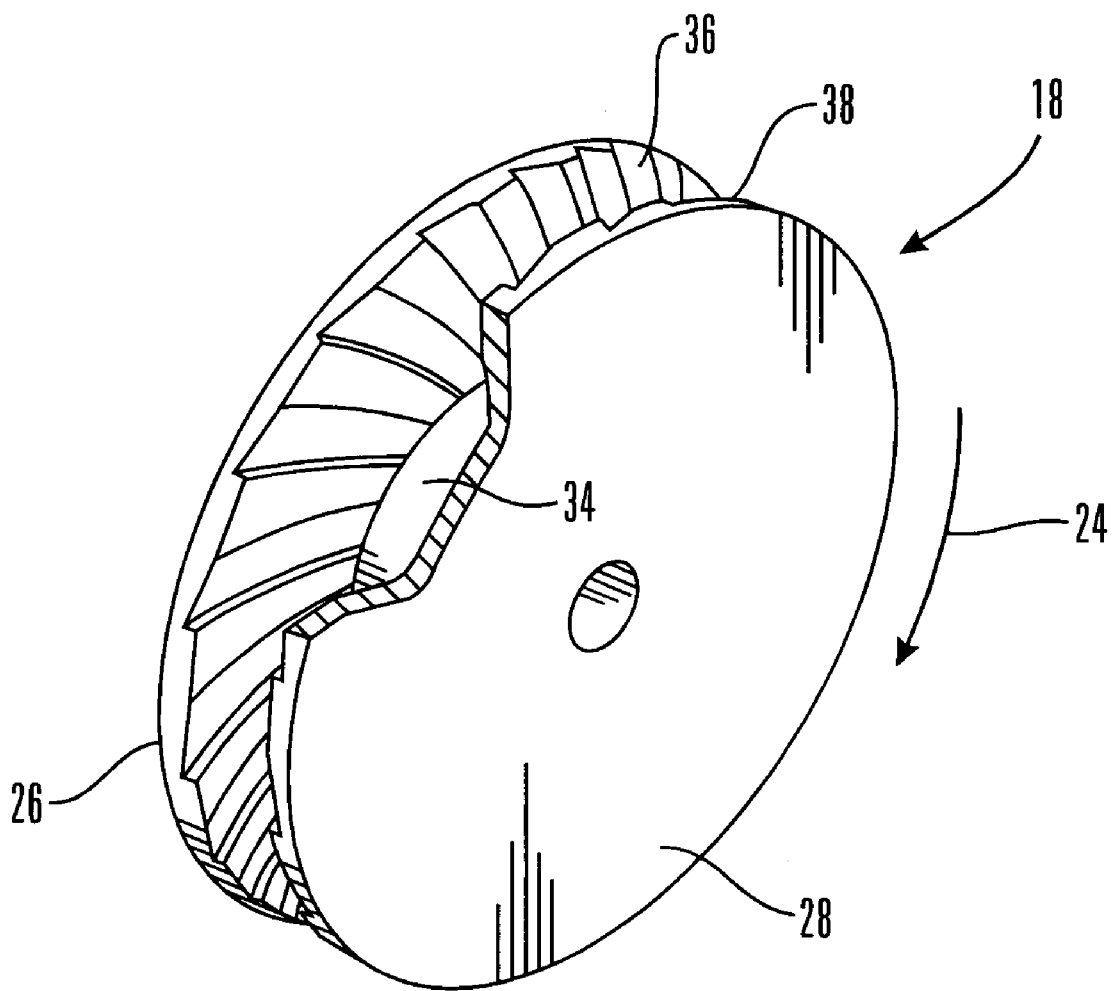
FIG. 2 is a perspective cut away view of the prior art drive rotor of the transport apparatus of FIG. 1.
Figure 3:
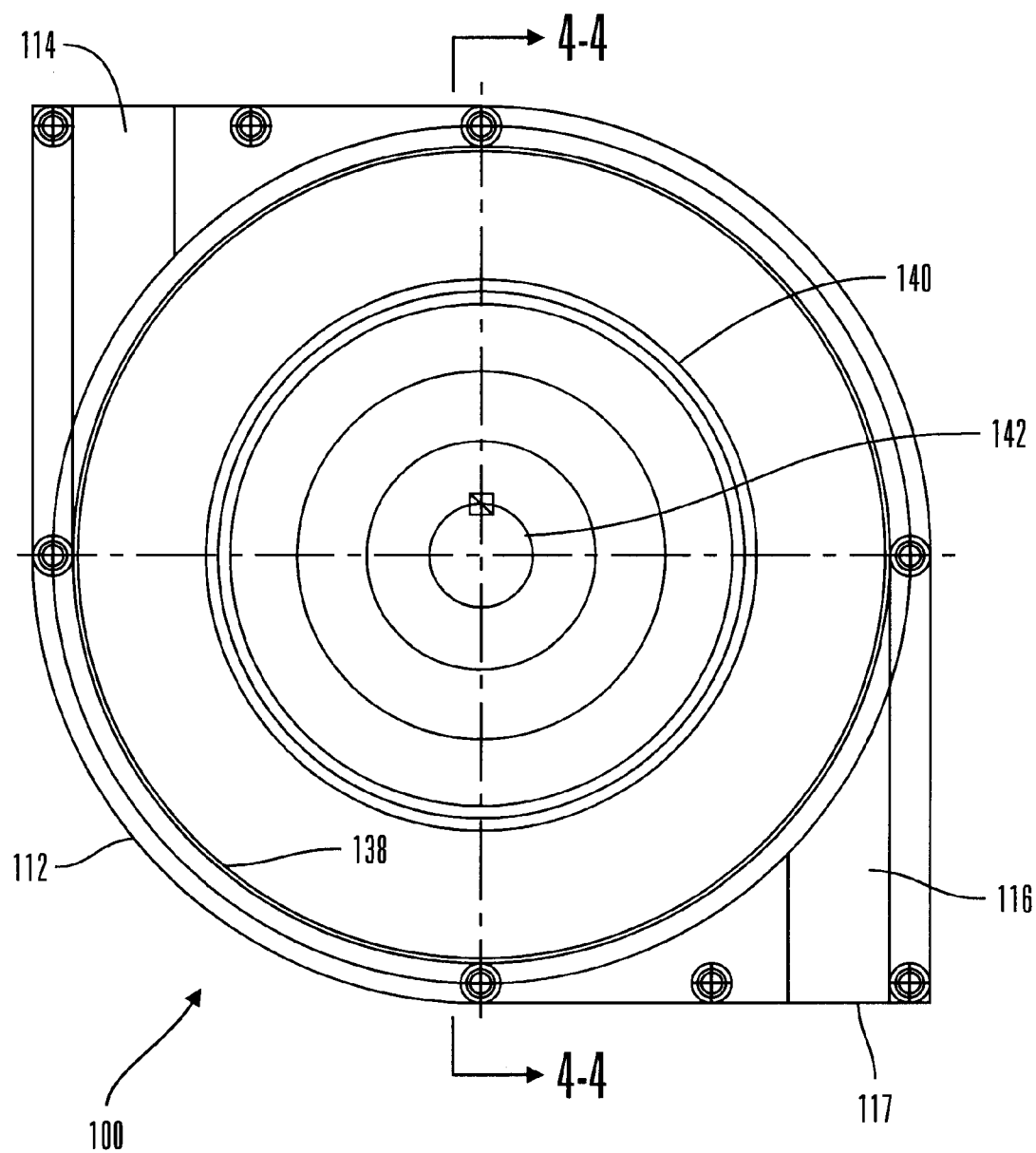
FIG. 3 is a sectional side view of a transport apparatus according to an embodiment of the present invention.
Figure 4:
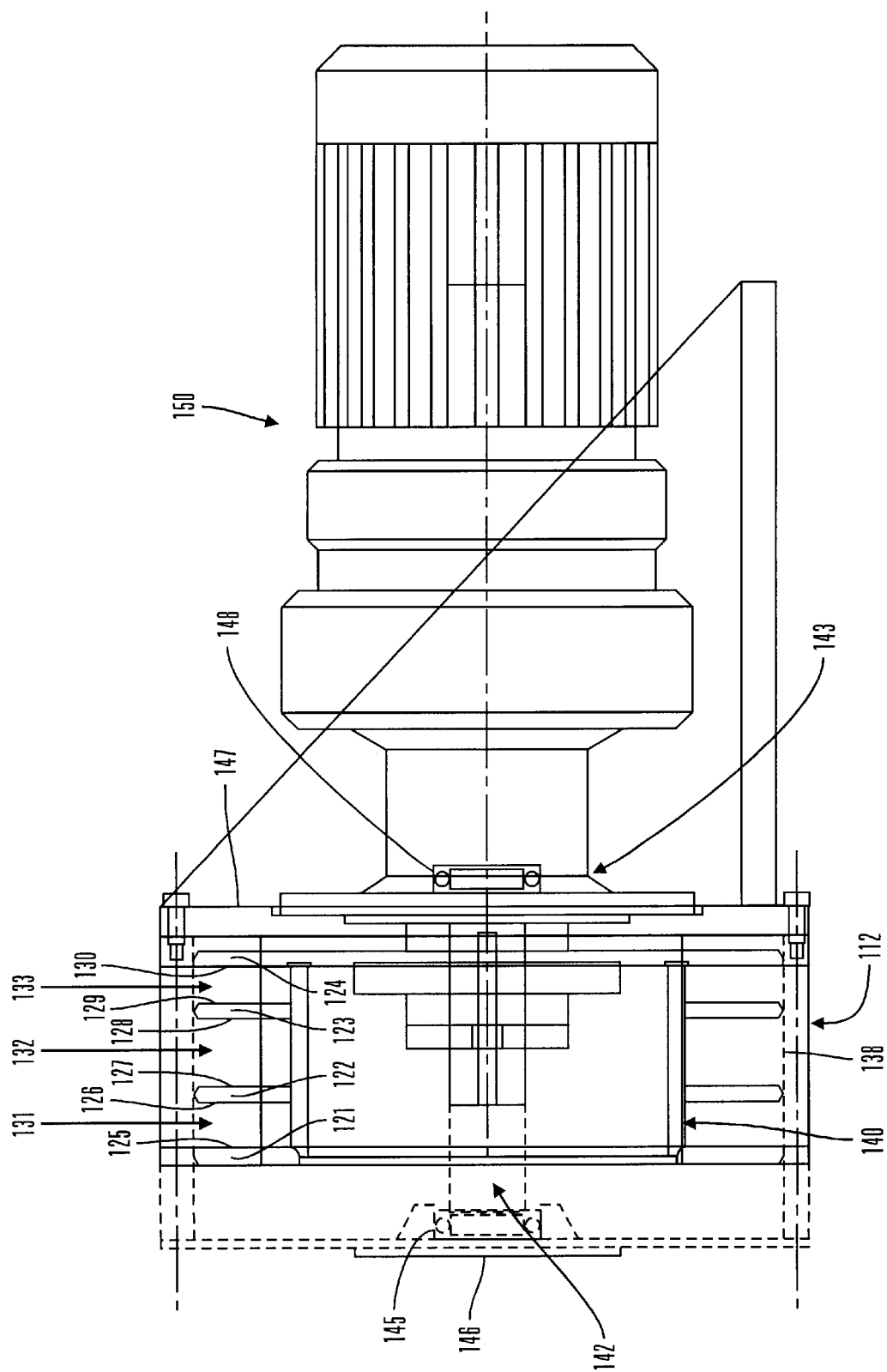
FIG. 4 is a cross section view of the transport apparatus shown in FIG. 3, taken along line 4—4 in FIG. 3

While, as noted above, an apparatus according to an example embodiment of the present invention may appear, in side view, similar to the prior art apparatus in FIG. 1, a further example apparatus embodiment of the present invention is shown, in side view, in FIG. 3. The FIG. 3 apparatus embodiment is also shown in FIG. 4, in cross-sectional view, along the cross-section lines 4—4 of FIG. 3. A further embodiment is shown in exploded view in FIG. 5, wherein components corresponding to components in the embodiment of FIGS. 3 and 4 are correspondingly numbered.

More specifically, FIGS. 3 and 4 show a transport apparatus 100 having a housing 112, an inlet 114 and an outlet 116 defining an outlet opening 117. As best shown in FIG. 4, the housing 112 contains a drive rotor 118 having a plurality of drive surfaces which define a plurality of transport channels.

In the embodiment of FIGS. 3 and 4, four disks 121–124 define six drive surfaces 125–130 and three transport channels 131–133 therebetween. The end disks 121 and 124 each define a single drive surface 125 and 130, respectively. On the other hand, the intermediate disks 122–123 each define two drive surfaces; that is, drive surfaces 126 and 127 are the two faces of disk 122, and drive surfaces 128 and 129 are the two faces of disk 123. Each transport channel 131–133 is located between a pair of opposed drive surfaces and is bordered on a third side by a stationary glide surface 138 within the housing interior and on a fourth side by a hub section of the rotor 118.

In one preferred embodiment, the rotor 118 comprises a single, generally cylindrical hub member 140, the plurality of disks 121 to 124 (either fixedly secured to the generally cylindrical hub or formed integral therewith) and a pair of shaft sections 142 and 144 extending from the opposed ends of the hub. The shaft sections 142 and 144 may be two respective sections of a single shaft extending axially through the center of the hub (as shown in broken lines in FIG. 4). Alternatively, the shaft sections 142 and 144 may be two individual, but axially aligned, shafts that are coupled to (or formed integral with) the hub 140 or the end disks 121 or 124. In yet a further embodiment, shaft section 142 (and corresponding bearing 145, described below) may be omitted and the rotor 118 may be supported in a cantilevered fashion by shaft 144 (and bearing 148 described below), as shown in solid lines in FIG. 4.

Thus, as shown in FIG. 4, the shaft section 144 extends from a first end of the hub 140 and is coupled to a drive transmission device 143. In one embodiment, the shaft section 144 is supported for rotation by a first bearing member 148 on a wall 147 of the housing to support the rotor 118 in a cantilevered manner, as shown in solid lines in FIG. 4. Alternatively, a second shaft section 142 may extend from the second end of the hub 140 to be supported for rotation on housing wall 146, by a second bearing member 145, as shown in broken lines in FIG. 4.

The drive transmission device 143 is operatively coupled to a drive motor 150 or other suitable drive means to transmit rotary drive force from the motor to the shaft 142 and, thus, to the drive rotor 118. In preferred embodiments, suitable motor speed, transmission or braking controls (not shown) are provided to allow control and regulation of the rotational velocity of the shaft 142 and, thus, the drive surfaces 125–130.

With respect to any one transport channel 131, 132 or 133, the principles of operation are similar to a single channel device such as described in any or a combination of the above-cited patents. Accordingly, principles of operation with respect to an individual transport channel described in the above-cited patents are incorporated herein by reference. In general, in each of the transport channels 131–133, particulate material is acted upon by the drive walls associated with the channel and frictional forces associated with the stationary glide surface 138, to form a compacted, moving dynamic mass at the outlet of the apparatus. However, with three transport channels as illustrated in FIG. 4, the combined transport rate (or through-put) may be as high as three times the rate of a single channel apparatus having a single channel with a cross-section area equivalent to one the three channels.

Furthermore, better metering precision may be obtained with the multiple-channel apparatus, than with a single channel apparatus having larger transport channel sizes (cross-sections) than the channel size (cross section) of one of the channels in the multiple-channel apparatus. Larger transport channels have a greater tendency to produce avalanching or cascading effects (surging and slowing of the feed rate) at the outlet, instead of feeding out at a uniform feed rate. Because multiple channels apparatuses may be configured with smaller channel sizes than single channel apparatuses having similar feed rate and volume capabilities, avalanching and cascading effects at the outlet may be minimized without limiting the feed rate and volume.

Yet further advantages with respect to feed control are available with the multiple channel device, such as the ability to feed at a metered rate and uniform distribution over a relatively wide area. Thus, for a given channel width W, a multiple-channel apparatus having N side-by-side channels (where N>1) will define an overall width (combined width of all channels) of NW, which is greater than the overall channel width W of an apparatus having a single channel (N=1). Accordingly, for a given channel width, the width of the area at the outlet of the N channels is thus, greater than the width of the area at the outlet of a single channel apparatus. Therefore, according to one preferred embodiment, multiple channel apparatuses are employed in systems which feed material, for example, at a uniform and controlled rate, over a wide surface area, such as onto a wide process feed belt or to a material processing machine having a wide processing area, such as an array of hammers in a multiple-hammer hammermill.

In addition, for a given channel width, the inlet area defined by a multiple channel apparatus is greater than that defined by a single channel apparatus. Thus, according to further embodiments of the present invention, multiple channel apparatuses are employed in systems which supply material to the apparatus over a relatively wide area. In addition, multiple channel apparatuses may be configured with relatively wide inlet openings and, thus, may be employed for transporting materials that have a tendency to bridge or jam within smaller width inlet openings. Multiple channel apparatus can provide further advantages with respect to the ability to feed fine or powdery materials while minimizing fluidization of the material within the channels and minimizing cascading or surging effects at the outlet (as compared to a single channel defining the same volume as the multiple channels).

Figure 6:
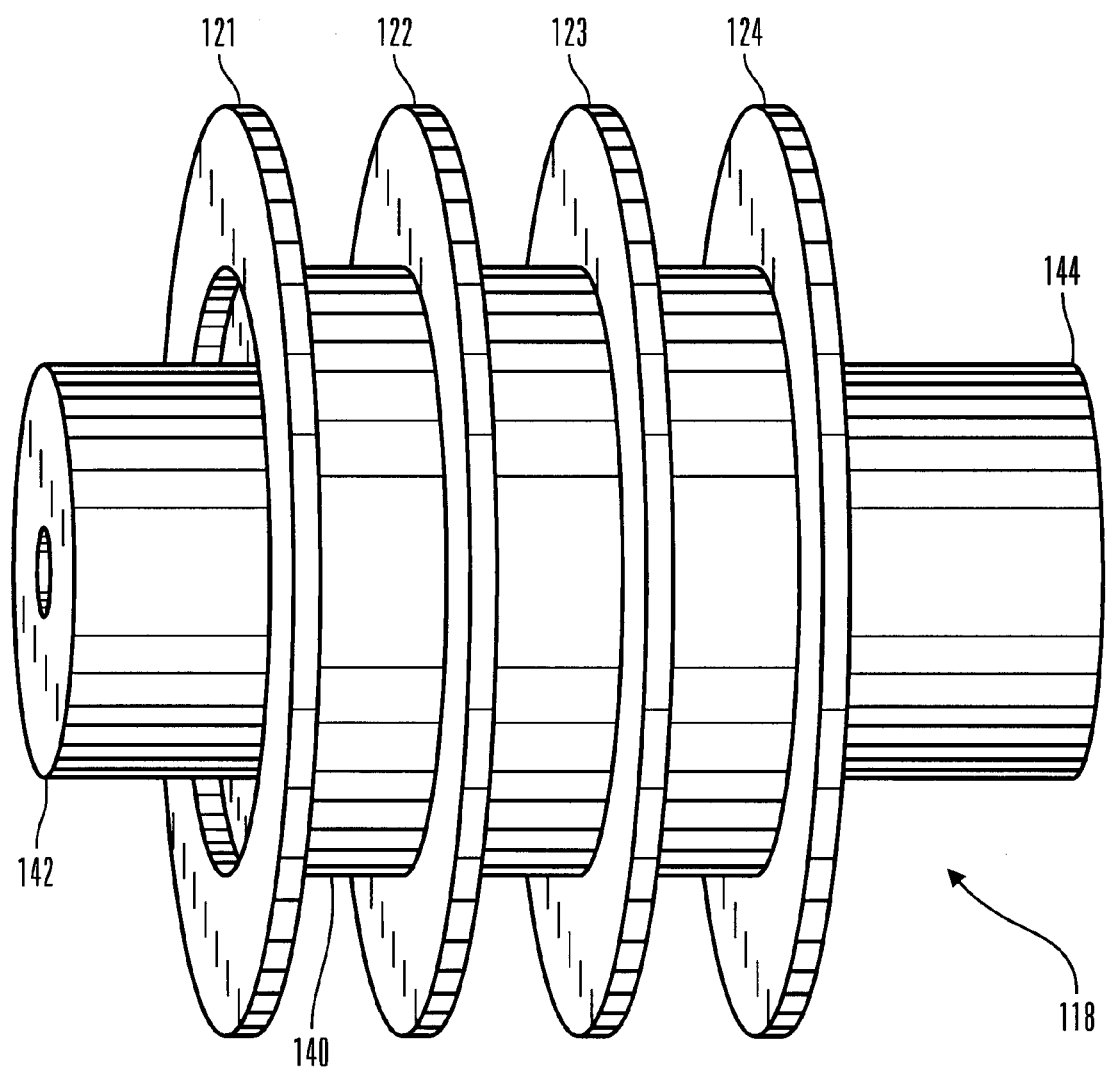
FIGS. 6–8 are exploded views of drive rotors according to further embodiments of the present invention.

In preferred embodiments, the hub 140 of the rotor 118 comprises a unitary cylindrical member to which a plurality of disks and the two shaft sections 142 and 144 are either coupled or integrally formed, for example, as shown in FIG. 6. In one preferred embodiment, the rotor (including the hub, disks and shaft sections) are formed as a single unitary body, for example by such processes as, but not limited to, molding, casting, machining from a solid body, selective deposition modeling, stereolithography, a combination thereof, or the like. A unitary drive rotor structure can be beneficial with respect to minimizing manufacturing cost and minimizing assembly complexity.

According to alternative embodiments, the drive rotor 118 comprises an assembly of a plurality of rotor components which may be manufactured individually. For example, in the FIG. 7 embodiment (shown in exploded view) the rotor components include a generally cylindrical hub member 140 and a plurality of disk members 121–124. The disk members each have a central opening of a diameter dimensioned, with respect to the diameter of the cylindrical hub member, to allow the disk members to slide axially over the hub member for positioning the disks at respective disk positions along the length of the hub member.

Figure 7:
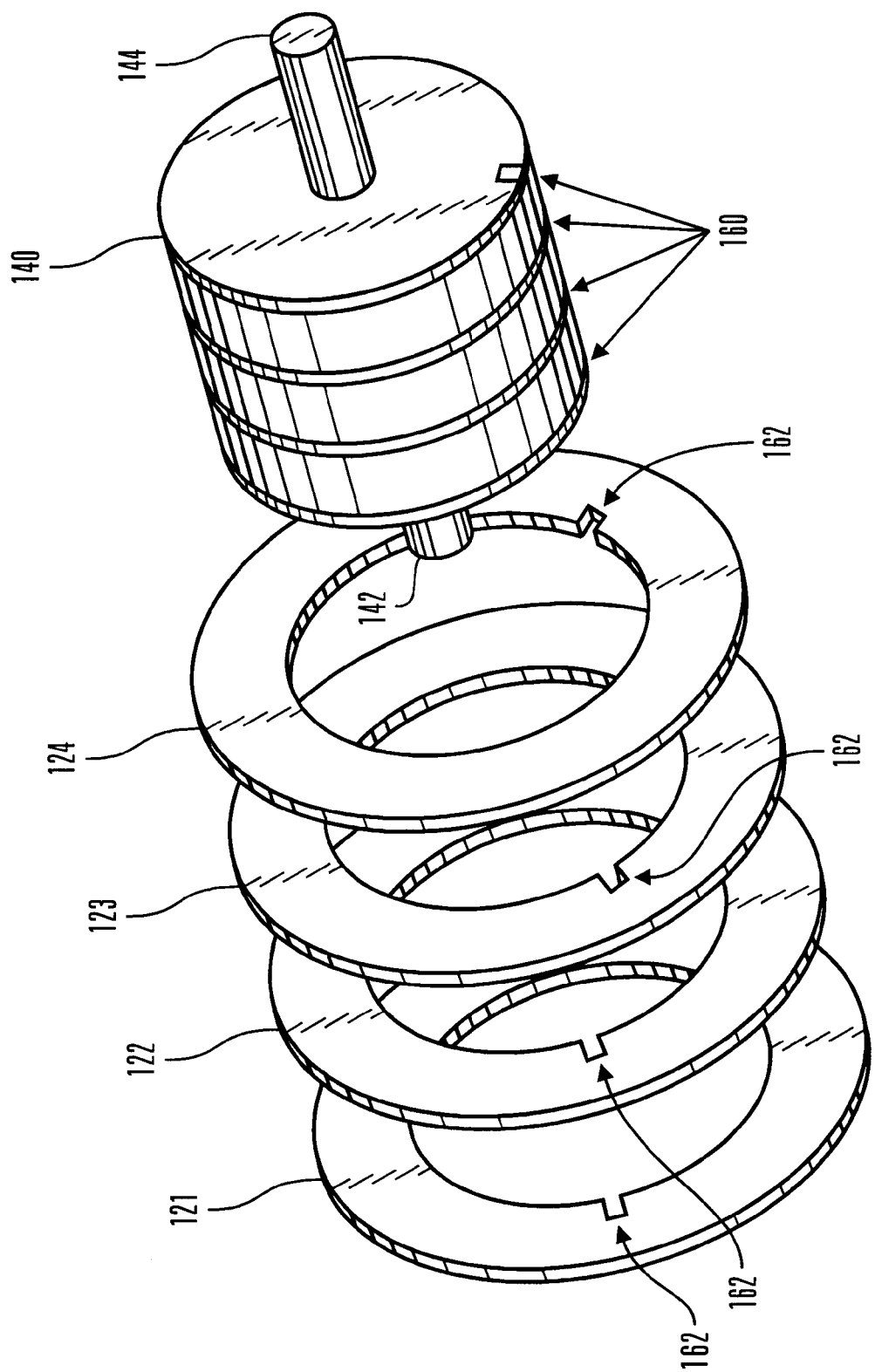

According to the FIG. 7 embodiment, the disk members 121–124 are manufactured separately from the hub member 140 and then are assembled and coupled with the hub member. The disk members may be coupled in an operationally fixed position relative to the hub member by any suitable coupling means, including, but not limited to welding, bolting, brazing, swaging and the like. Alternatively (or in addition), a plurality of key slots 160 (or other suitable coupling or alignment components) may be formed or provided at suitable locations along the length of the hub member to mate with key members that fit into corresponding slots 162 on the disk members.

The shaft ends 142 and 144 in the FIG. 7 embodiment may comprise two ends of a common shaft extending through the length of the hub member 140. Alternatively, the shaft ends may be two separate, but axially aligned shafts extending from two opposite ends of the generally cylindrical body of the hub member 140.

Embodiments, such as that of FIG. 7, wherein the drive rotor is assembled from disk member components and a single hub component can allow flexibility in rotor designs, while minimizing manufacturing costs by minimizing the number of different types of components. For example, a plurality of different rotor designs, each having different disk spacings (spacings between disks) and/or different numbers of disks may be manufactured using components as shown in FIG. 7, but with the disk-to-hub coupling locations (or key or slot 160 locations) selected to allow more or less disk members to the hub member or to provide a variety of disk member spacing arrangements.

Figure 8:
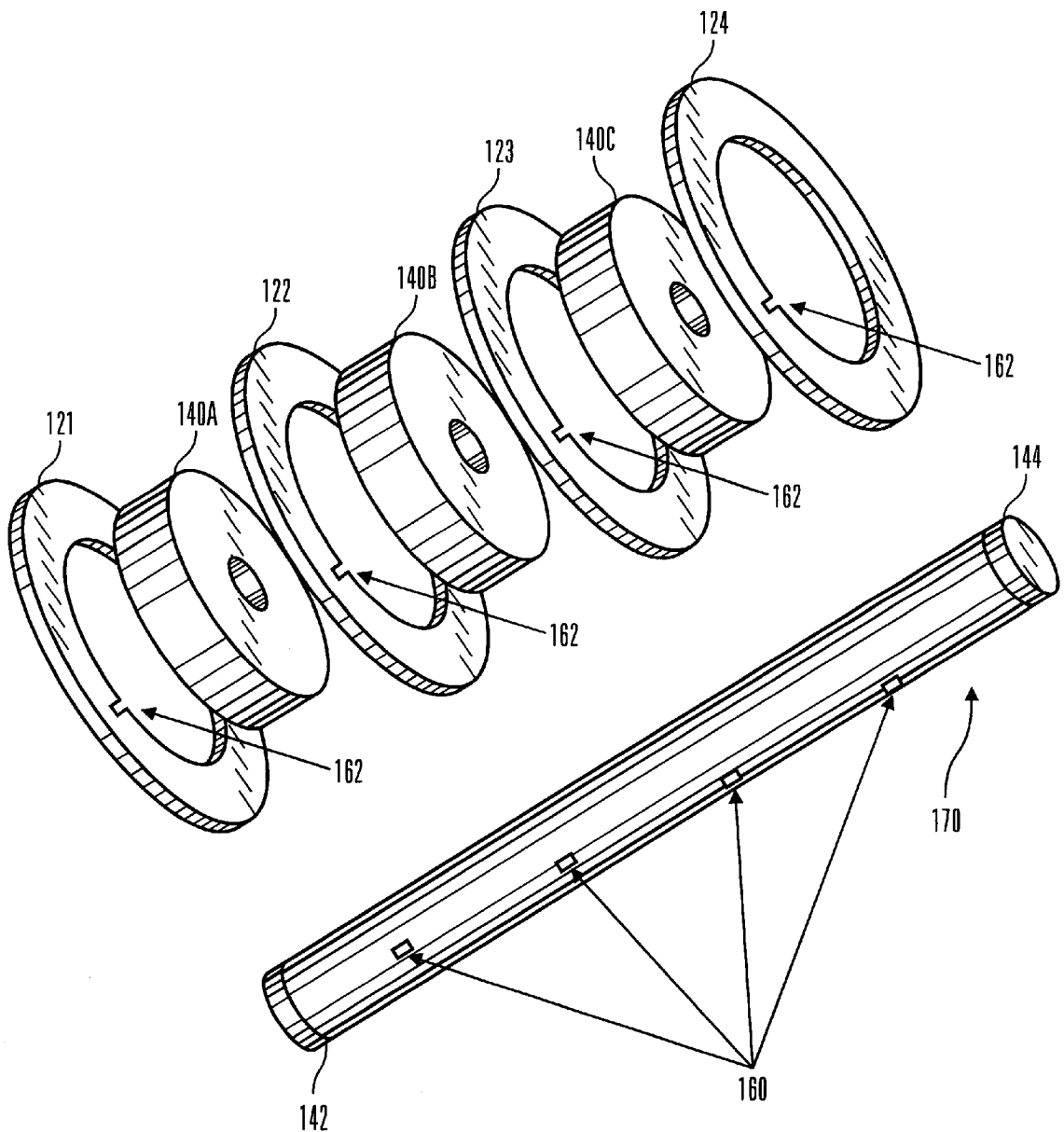

Another rotor assembly embodiment having separate disk and hub members is shown in FIG. 8. In the FIG. 8 embodiment, the rotor assembly includes a central shaft 170 (defining shaft end sections 142' and 144') and a plurality (four) of disk members 121'–124'. Also, instead of a single, common hub member, the FIG. 8 embodiment includes a plurality (three) of generally cylindrical hub members 140a–140c, wherein each hub member is disposed between a respective pair of disk members. Each of the disk and hub members includes a central opening of a diameter dimensioned, with respect to the diameter of the central shaft 170, to allow the disk and hub members to slide axially over the central shaft for positioning the disks at respective disk positions along the length of the shaft. Keys or slots (or other suitable coupling or alignment components) may be formed or provided at suitable locations along the length of the shaft to mate with corresponding slots or keys on the disk and hub members, similar to that described above with respect to the keys and slots 160 and 162.

Rotor assembly embodiments with a plurality of separate hub members, such as the FIG. 8 embodiment, also provide advantages with respect to design flexibility, minimization of disk repair and replacement cost, and minimization of the number of different types of parts that must be manufactured for different rotor designs, as described above with respect to the FIG. 7 embodiment. Assemblies having a plurality of hub members can also provide the advantage of allowing replacement of a scored or otherwise damaged hub sections. However, such embodiments require more components and can be more expensive to manufacture and assemble than a single, common hub design, as shown in FIG. 7.

Figure 9:
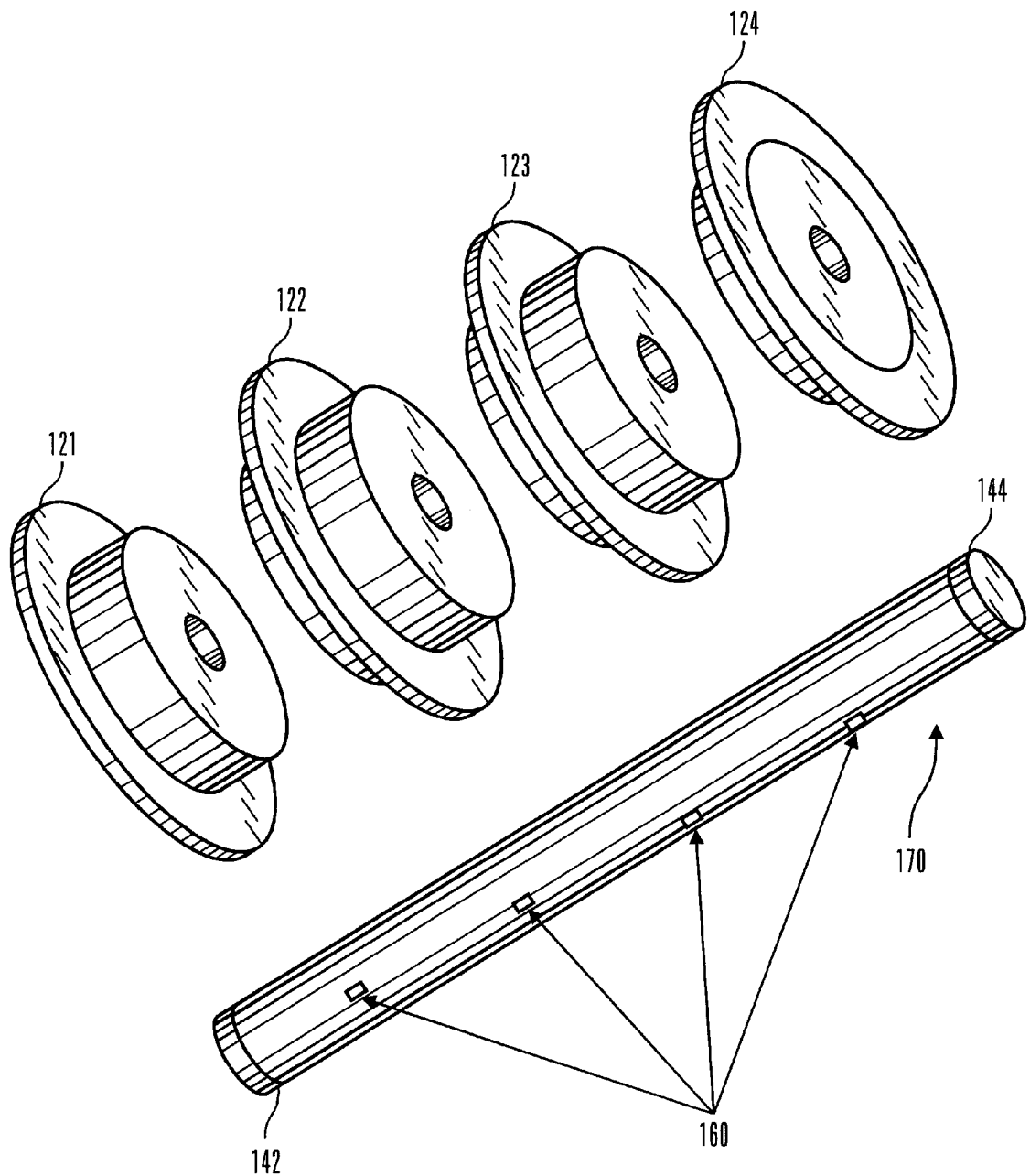
FIG. 9 is an exploded view of a transport apparatus according to a further embodiment of the present invention.

Yet another rotor assembly embodiment having separate disk and hub members is shown in FIG. 9. In the FIG. 9 embodiment, the rotor assembly includes a central shaft 170 and a plurality (four) of disk members 121"–124". Each of the disk members shown in FIG. 9 includes a disk and a hub section coupled, or formed integral with each other. For example, the two end disk members 121" and 124" each have a single, generally cylindrical hub section coupled or formed integral therewith and extending axially from one disk face. Each of the intermediate disk members 122"–123" have two hub sections coupled or formed integral therewith and extending from the two respective disk faces. Each of the disk members includes a central opening of a diameter dimensioned, with respect to the diameter of the central shaft 170, to allow the disk members to slide axially over the central shaft for positioning the disks at respective disk positions along the length of the shaft. Keys or slots (or other suitable coupling or alignment components) may be formed or provided at suitable locations along the length of the shaft to mate with corresponding slots or keys on the disk members, similar to that described above.

When arranged on the central shaft 170, the hub portions that extend from the facing surfaces of each pair of adjacent disk members in FIG. 9 are abutted end-to-end with each other, to define a complete hub section between the two adjacent disks. In alternative embodiments, one or more disk members 121"–124" may be devoid of a hub section, but instead abut the hub section of an adjacent disk member or the hub sections of two adjacent disks. Also in alternative embodiments, one or more intermediate disk members 122"–123" may be provided with only one hub section extending axially from one disk face, while the other disk face abuts the hub section of an adjacent disk member.

Figure 5:
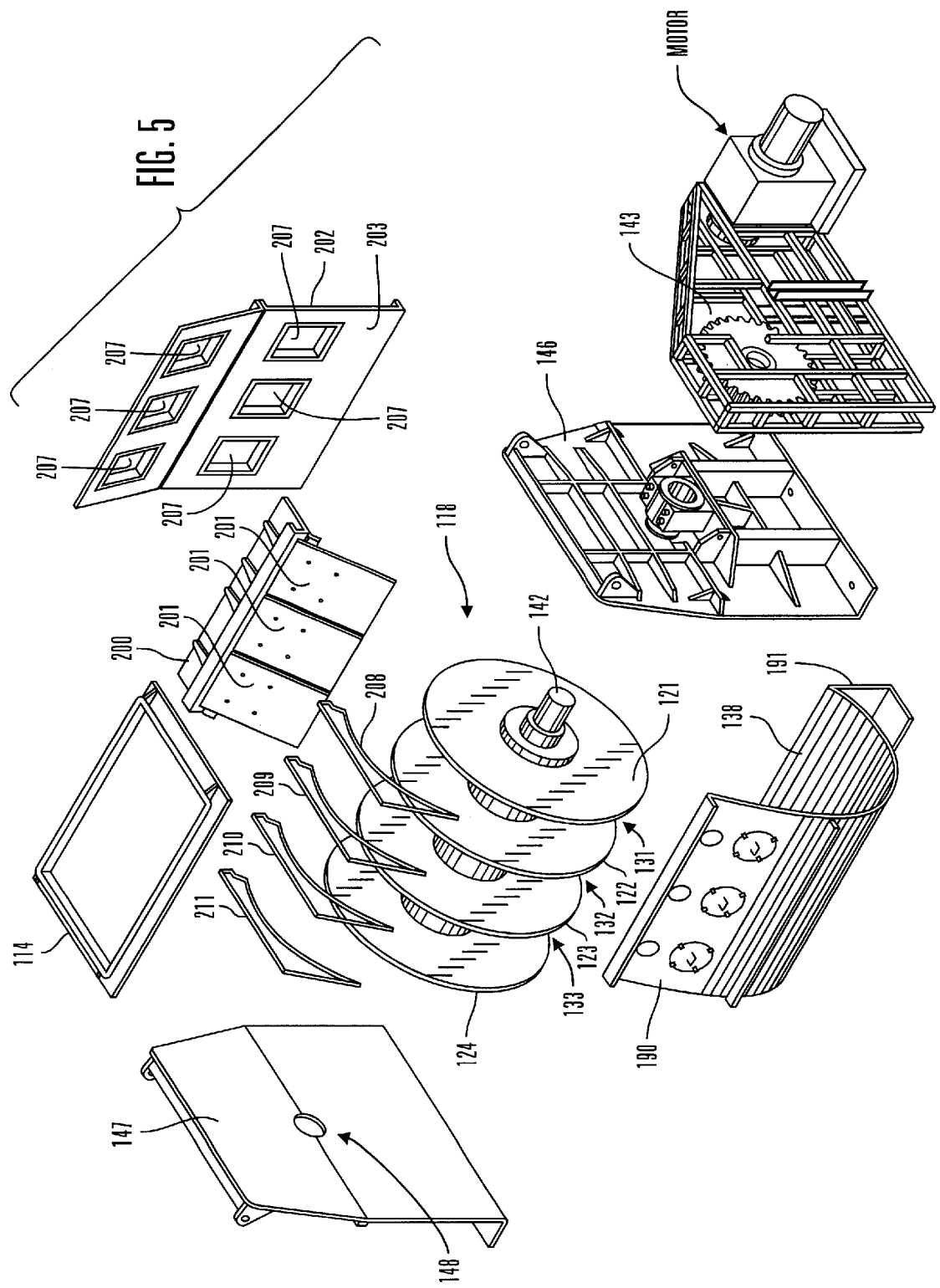
FIG. 5 is an exploded view of a feeder apparatus with a multiple channel drive rotor according to an embodiment of the present invention.

The exploded view of FIG. 5 illustrates further aspects of a housing according to an embodiment of the present invention. The illustrated housing includes a rear housing wall 190, an abutment member 200, a front wall 202, and side walls 146 and 147 which, when assembled, define an open interior for containing a multiple-disk rotor 118. In preferred embodiments, the drive rotor 118 is formed as a single, unitary structure, such as described above with respect to FIG. 6. However, other embodiments may employ any suitable rotor assembly design, such as those described above with respect to FIGS. 7–9.

The rear housing wall 190 in FIG. 5 includes an inside surface which defines at least a portion of a stationary glide surface 138. A further portion of the glide surface 138 may be defined by other surfaces, such as the inside-facing surface of a bottom wall (not shown). However, in the FIG. 5 embodiment, the rear wall 190 is configured to curve around the bottom of the drive rotor and, therefore defines the rear and bottom walls of the housing as well as the stationary inner-facing surface 138 along substantially the entire length of each transport channel. The rear wall 190 includes a lip 191 along the bottom edge thereof.

The abutment member 200 in FIG. 5 comprises a plurality of abutment sections 201 separated by slots through which the disks extend, where each abutment section 201 fits within the space between a pair of disks associated with a corresponding transport channel 131–133. Each abutment section 201 directs the moving mass of particulate material in the associated transport channel, out of an outlet of the apparatus.

The front wall 202 includes six access doors or panels 207, which are aligned with the spacings between disks and which are removable to allow access to the housing interior, for example, for servicing, inspection, dust removal, or the like. Further openings may be provided, for example, in the rear wall 190, and covered with a durable, transparent material, to provide a viewing window into one or more of the transport channels. The front wall 202 includes a lower wall portion 203, which opposes and is spaced from the lip 191 of the rear wall of the housing, when assembled.

The housing in FIG. 5 includes an inlet 114 comprising a four-sided frame assembly, open through the center to all three transport channels 131–133. The housing also includes an outlet, comprising an opening defined between the lip 191 of the rear wall 190 and the lower portion 193 of the front wall 202, and between the two side walls 146 and 147. In one embodiment, the outlet comprises a single, elongated outlet opening which spans all of the transport channels. Alternatively, the outlet opening may be divided by one or more barrier members, for example, panels aligned with one or more disks, to maintain the separate flows of material from different transport channels separated from each other at the outlet.

A set of shroud members 208–211, one for each disk, may be provided between the inlet member 114 and the outer peripheral disk edges, to help direct incoming particles into the transport channels and to minimize the passage of dust and debris into other areas of the housing. The shroud members 208–211 may be coupled or formed integrally with the inlet member 114, the abutment member 200 or both. The walls 146 and 147 may be secured to the front and rear walls 202 and 190 by any suitable means including, but not limited to threaded connectors, rivets, welds, or the like. Similarly, the inlet member 114 may be secured to any one or combination of the four walls 146, 147, 190 and 202, and the abutment member 200 is secured to the front wall 202, by any suitable means including, but not limited to those discussed above.

Various aspects of the present invention may be employed in a wide variety of multi-channel apparatus configurations. For example, while the embodiment illustrated in FIGS. 3–9 employ three transport channels (defined between four disks), other embodiments may employ any suitable number of disks for providing two or more transport channels. The number N of disks is preferably selected, based on a number of factors, for example, relating to characteristics of the material to be transported (such as mass, size, moisture content, etc.) and relating to system demands (such as feed volume demand, inlet or outlet area demand, etc.). In preferred embodiments, the disks are arranged coaxially, wherein each end disk in the coaxial arrangement defines a single drive surface, while each intermediate disk in the arrangement defines two drive surfaces (one for each disk face). Accordingly, in such an arrangement, a number N of disks will define N-1 transport channels and 2N-2 drive surfaces.

Figure 10:
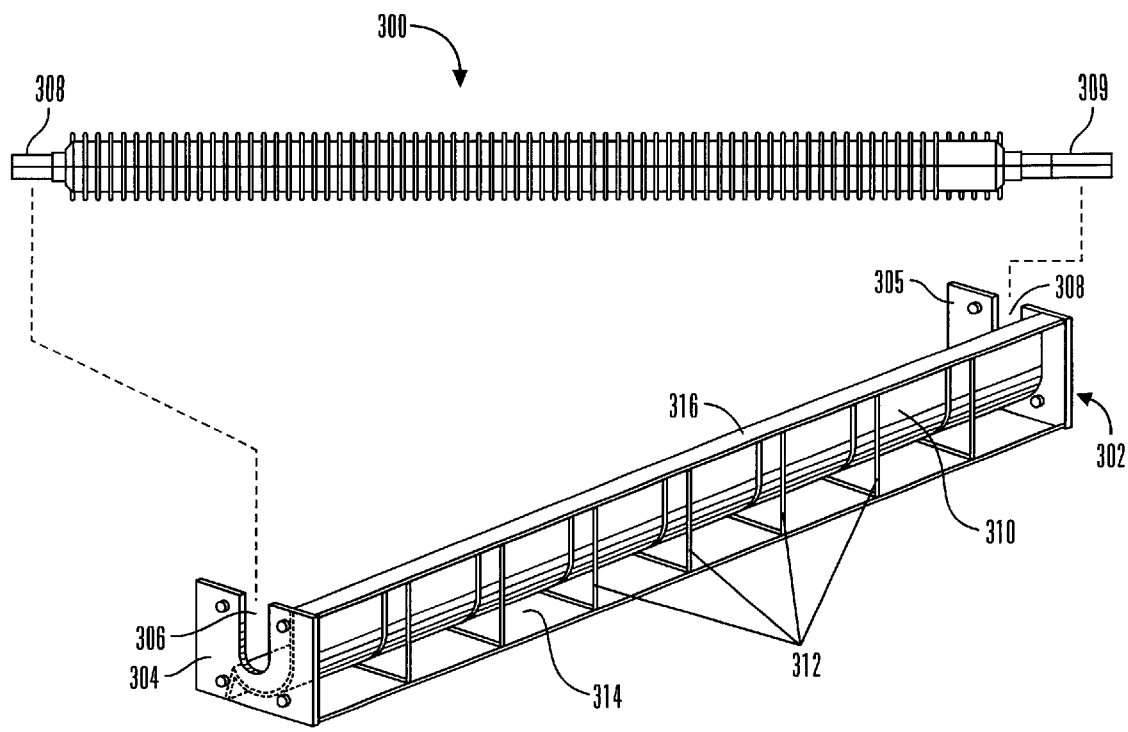
FIG. 10 is an exploded view of a rotor and housing components of a transport apparatus according to yet a further embodiment of the present invention.

FIG. 10 shows embodiments of housing and drive rotor components of a multi-channel apparatus (in exploded view), wherein the drive rotor 300 has more than seventy disks. More particularly, FIG. 10 shows the two side walls and the rear side of a housing 302 configured to contain the rotor 300. The two side walls 304 and 305 include openings 306 and 307, respectively, through which the shaft sections 308 and 309 of the drive rotor 300 extend. Suitable bearing and seals (not shown) rotatably couple the shaft sections within the wall openings 306 and 307, respectively. While not shown in FIG. 10, a drive motor may be coupled to one of the shaft sections 308 or 309, for example, through a transmission member, as described above. Also, while not shown in FIG. 10, an apparatus according to the FIG. 10 embodiment further includes other components described above with respect to the embodiment of FIGS. 3–5, including an inlet member, a front wall defining one or more outlet openings and an abutment member. The FIG. 10 embodiment may also include shroud members as described above. However, in further embodiments, the shroud members may be omitted.

Figure 11:
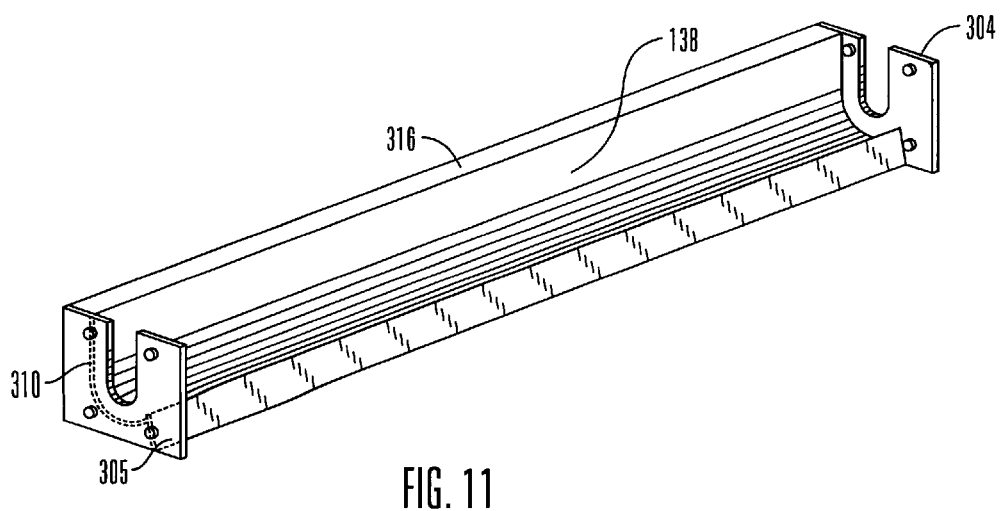
FIG. 11 is a perspective view of the housing components of the FIG. 10 embodiment.

A glide plate 310 extends from one housing side wall 305 to the opposite side wall 306 and curves around the periphery of the rotor disks, from the inlet to the outlet of the housing. As best shown in FIG. 11, the glide plate 310 defines the stationary surface 138 which defines the outer periphery of the transport channels, such as described above with respect to the FIG. 9 embodiment. A set of support rib members 312 may be disposed along the length of the glide plate. Each support rib member 312 comprises a plate section extending substantially perpendicular to the glide plate 310, between the glide plate and the base 314 and also between the glide plate and the rear side of the housing. A top flange plate 316 is provided along the length of the glide plate 310, adjacent the inlet.

The inlet member for the housing embodiment of FIG. 10 may comprise a frame structure having a single opening feeding all of the transport channels simultaneously, similar to that described above with respect to the FIG. 9 embodiment. In further embodiments, however, the inlet member may include (or be coupled to) a plurality of separate inlet channels, wherein each inlet channel is aligned with (and feeds) a respective individual transport channel or set of transport channels. For example, FIGS. 12 and 13 show an embodiment of an inlet member 320 having six separated inlet channels 321–326 coupled to feed material into the transport channels of drive rotor 300 of the FIG. 10 embodiment.

Each inlet channel 321–326 effectively operates as a hopper or funnel, directing particulate material within the channel into the inlet of the transport apparatus, directly above a respective plurality of transport channels. Each inlet channel 321–326 may be coupled to the same or different sources 328 of material, such as a reservoir, hopper, fluidized entrainment device or other material storage or conveyance device.

In operation, particulate material is provided from one or more sources 328 to the inlet channels of the inlet member 320. The particulate material is stored within the hopper-like configuration of the inlet channels and is directed through the inlet opening of the housing. This incoming particulate material enters the transport channels of the drive rotor, while the rotor is rotatably driven within the housing. The rotary motion of the disk faces on the incoming particulate material, in combination with the friction provided by the stationary surface 138, impart a compaction and drive force on the material. As a result, the material forms a moving dynamic mass in each transport channel, which is conveyed out the outlet of the apparatus.

Figure 13:
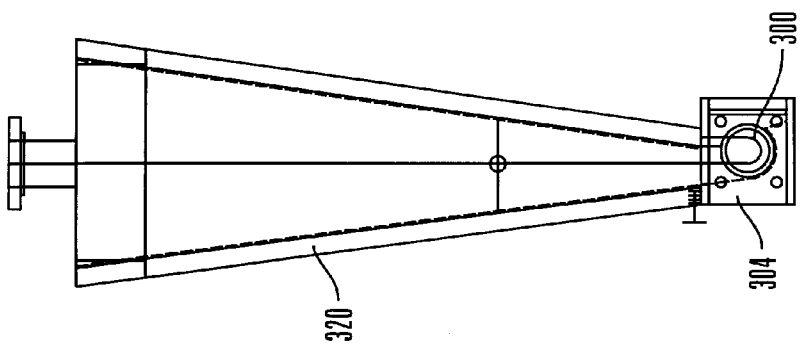
FIG. 13 is a side view of the transport apparatus and inlet member of the system of FIG. 12.
Figure 12:
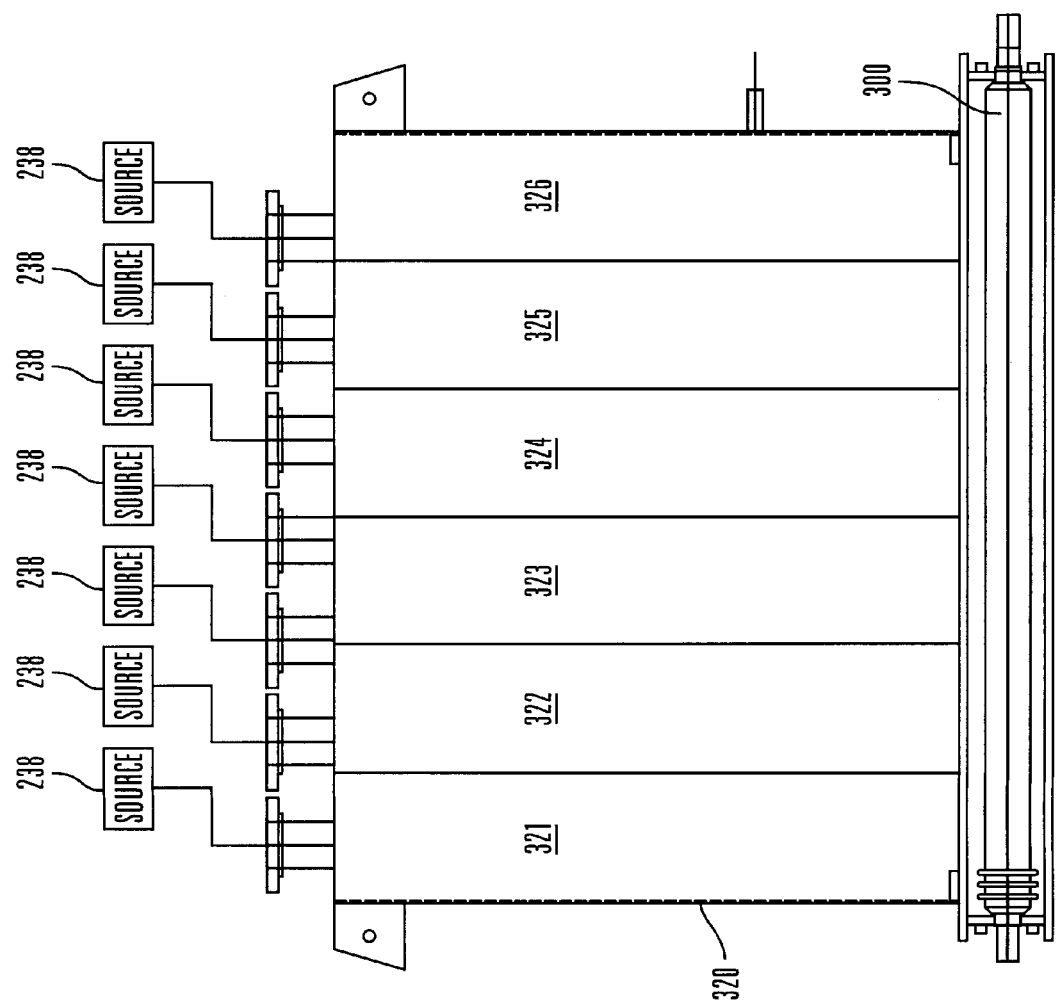
FIG. 12 is a front schematic view of a transport system employing a transport apparatus according to the FIG. 10 embodiment.

Embodiments which employ separate inlet channels for separate transport channels (or sets of transport channels), such as shown in FIGS. 12 and 13, may be employed to convey and meter a mixture of different materials from respectively different sources 328. Moreover, the concentration of various materials in the metered mixture may be controlled by controlling the number of transport channels which receive the various types of materials. Thus, for example, because the system shown in the FIG. 12 includes six inlet channels that are coupled to six separate sources of material and feed an equal number of transport channels, the system will discharge a mixture composed of substantially equal concentrations (by volume) of the six different types of materials. However, other embodiments may employ more or less inlet channels and more or less different sources of material, to provide other mixtures and concentrations.

In further embodiments, more than one inlet channel may be coupled to the same source, to increase the concentration of material from that source in the mixture discharged from the transport apparatus. In yet further embodiments, the number of transport channels aligned with each inlet channel may vary among the different inlet channels, again to control the concentration of different materials in the resulting discharge mixture. In yet further embodiments, one or more of the inlet channels may be selectively closed or blocked from receiving material from a source or from feeding material to the transport apparatus, to control the resulting discharge mixture or rate.

Figure 14:
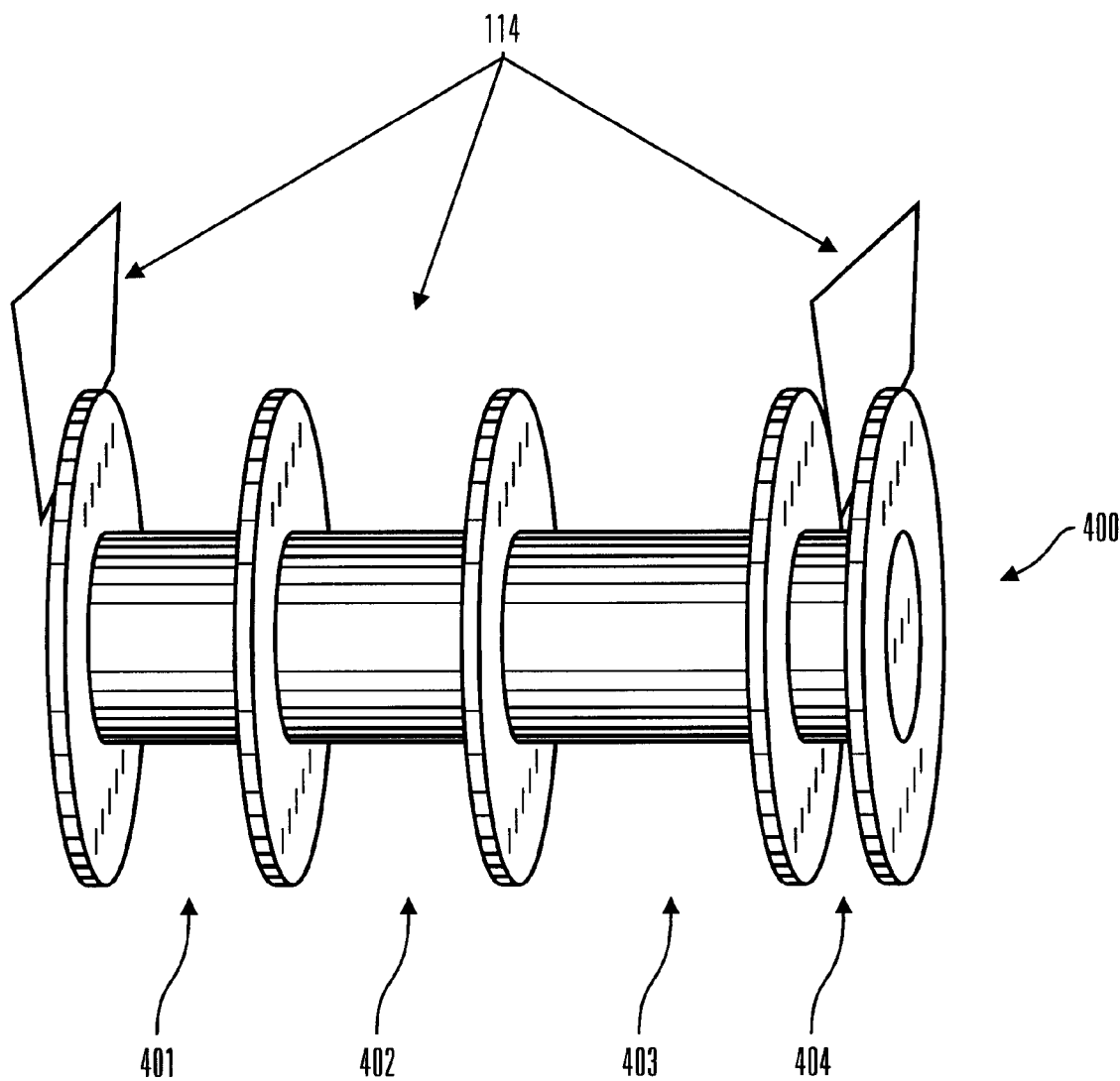
FIG. 14 is a representative diagram of a rotor and inlet arrangement.

Thus, a multiple-channel apparatus can provide the ability to divide one inlet flow (a single flow of material to an inlet common to all channels) in a ratio dependent on the set spacings between disks (channel widths). For example, a rotor 400, as shown in FIG. 14, may include a plurality of (four in FIG. 14) channels 401, 402, 403 and 404, the respective widths of which are defined by the relative spacings between adjacent disks. The plural channels are fed by a common inlet 114. In this manner, the flow of material fed into the apparatus through the common inlet 114 is automatically divided into the plural channels 401–404, at a ratio determined by the relative channel widths. Thus, the relative channel widths in FIG. 14 may be, for example, 2:3:4:1 would provide a division of the volume of inlet material into the same ratio. The outlet of the apparatus may be divided into separate outlet channels (for example, by positioning barriers in the outlet as discussed above) to maintain the division of the material in the prescribed ratio, as the material exits the apparatus. In this manner, the outlet may feed material into multiple flow paths, one for each channel 401–104, such that the ratio of the volume of material fed into the flow paths corresponds to the ratio of the channel widths.

Alternatively, the plural channels may be fed, at the inlet side, with materials from a corresponding plurality of separate sources and the flow at the outlet side may be a combined flow from all of the channels. In this manner, the apparatus may provide a mixing operation (at a ratio defined by the relative channel widths), while feed the materials. Thus, several inlet streams of material (for example, sand, cement and gravel) may be fed at a constant ratio to the inlet to provide a resulting mixture (for example, a concrete mixture) from the outlet of the apparatus.

Figure 15:
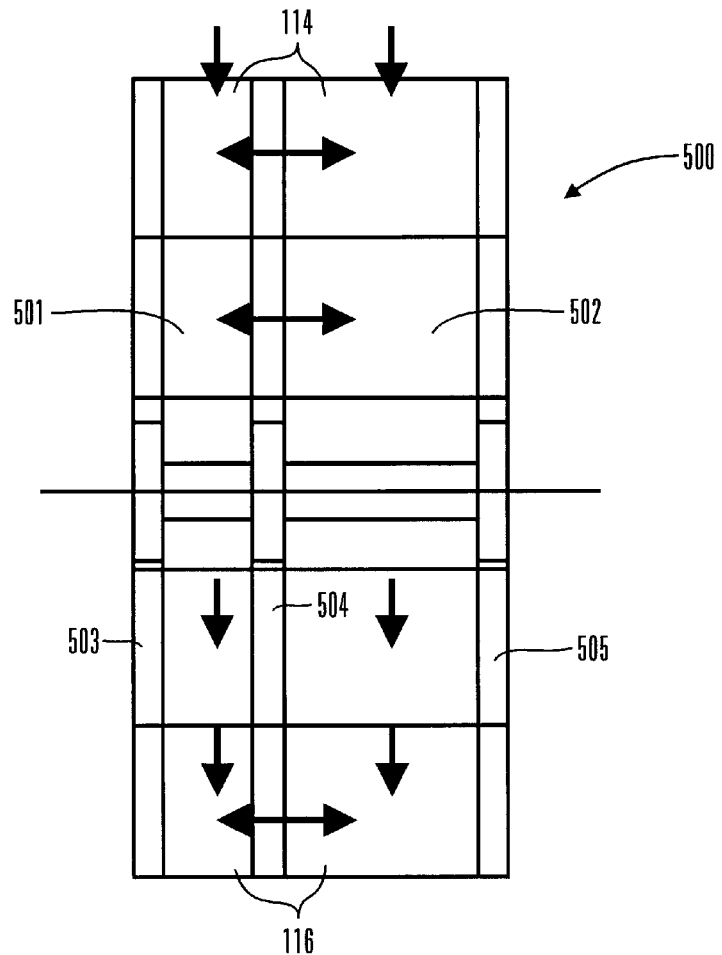
FIG. 15 is a representative diagram of a further rotor and inlet and outlet arrangements.

In a further embodiment, the position of at least one disk relative to the axial dimension of the drive rotor is variable and may be selected and changed, for various applications of use. Thus, for example, FIG. 15 shows a drive rotor 500 having multiple (two) channels 501 and 502, defined by multiple (three) disks 503, 504 and 505 supported on a hub 506. The center disk 504 is configured to be slidable along the axial length of the hub 506 and is securable to the hub at any position along the length of the hub, between the other two disks 503 and 505. Means for securing (fixing) the disk 504 to a selected position on the hub 506 may include, for example, key and slot arrangements, as described above. However, alternative mechanisms suitable for securing the disk 504 to the hub may be employed. By selecting the position of the disk 504, the ratio of the discharge from the two channels 501 and 502 on either side of the disk 504 is thereby selected. The discharge ratio may be reset by simply resetting the position of the disk 504 relative to the hub axis. Furthermore, while FIG. 15 illustrates a selectable ratio embodiment involving only one selectively positionable disk 504, other embodiments may employ any suitable number of selectively movable disks.

Also as shown in FIG. 15, in preferred embodiments, the inlet and/or the outlet of the housing may be provided with a movable frame portion or barrier which is selectively positionable to align with the selected position of the disk 504. In this manner, the separation of material between channels 501 and 502 is maintained at the inlet and/or the outlet.

Figure 16:
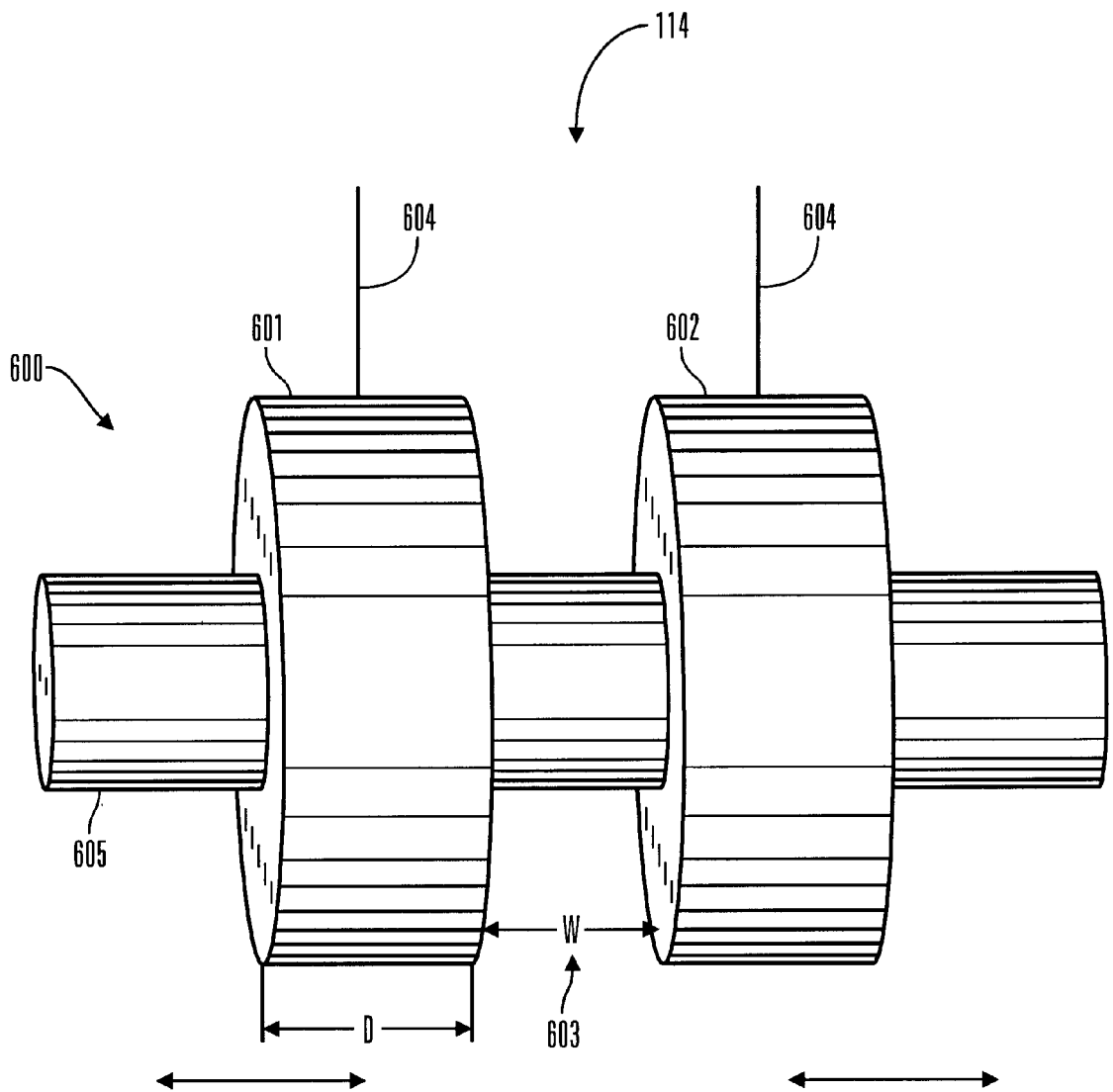
FIG. 16 is a representative diagram of yet a further rotor and inlet arrangement.

In yet a further embodiment of a selectably moveable disk arrangement, at least one of the disks is preferably provided with a width dimension (width between opposite-facing disk surfaces) sufficient to allow adjustment of one or more channel widths without altering the inlet and/or outlet duct dimensions. Thus, for example, as shown in FIG. 16, a rotor 600 is provided with a plurality of disks (two are illustrated as 601 and 602), defining one or more transport channels 603 (preferably plural transport channels) therebetween. Each disk is provided with a width dimension D (the dimension between opposite facing disk surfaces) which aligns with the edge of an inlet frame portion 604 or a barrier within the inlet opening, such that material fed through the inlet (between the frame portions 604) is directed into the channel 603. The width W of the channel 603 is dependent on the relative spacing between the disks 601 and 602. The channel width W may be adjusted by moving one or both disks 601 and 602, relative to the hub 605. However, because of the alignment of the inlet frame portions 604 with the width dimension D of the disk, each disk may be moved (up to a total distance D), while still maintaining alignment with the inlet frame portion. In this regard, the inlet need not be altered to accommodate different disk spacings. Similarly, the outlet may be provided with frame portions or barriers which align with the width dimensions D of the disks and which, therefore, need not be altered to accommodate different disk spacings. Accordingly, the channel width of a channel in a single channel device, or the channel width of one or more channels in a multiple-channel device, may be readily selected and varied, to select or change the output rate of the channel(s), without requiring alterations to inlet or outlet configurations.

In yet a further embodiment, a housing configuration may be provided for accommodating any one of a plurality of different drive rotors, wherein each drive rotor is provided with a disk spacing arrangement different from the other drive rotors. In this manner, a user may simply select a suitable drive rotor (with the suitable channel widths) for a particular application of use and install the selected rotor into the housing. The drive rotors may be selected, for example, based on the type of materials to be transported, or for providing particular mixing ratios, transporting ratios or the like. In this manner, a system may include a single housing, a set of a plurality of rotors, each having different disk spacings, and suitable mechanisms for allowing the installation and removal of any one of the plural rotors. A user, then, may select an appropriate rotor for a particular application of use, install the rotor in the housing and run the apparatus for the intended application. The user may employ the same housing and a different rotor for a second application of use.

Figure 17:
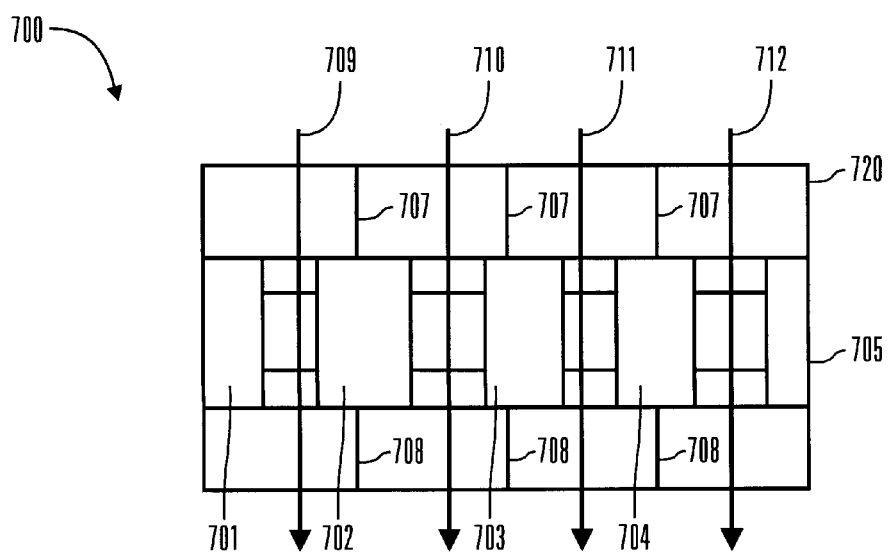
FIG. 17 is a representative diagram of a housing and rotor arrangement according to a further embodiment of the present invention.

In preferred embodiments of the replaceable rotor arrangement, at least the central disks of each rotor are provided with width dimensions D (width between opposite facing disk surfaces) sufficient to align with inlet frame portions or barriers and outlet frame portions or barriers of the common housing structure. Thus, for example, in the five disk (four channel) arrangement shown in FIG. 17, a rotor 700 is supported in a housing 720 and has disks 701, 702, 703, 704 and 705 which align with inlet frame portions or barriers 706 and outlet frame portions or barriers 708, to ensure that the flow paths through the channels are maintained, as shown by arrow 709, 710, 711 and 712. The blend ratio of material at the outlet is dependent on the relative spacings between the disks (the channel widths). Thus, the rotor 700 shown in FIG. 17 provides a particular blend ratio. A different blend ratio may be selected by installing a different rotor having different relative disk spacings (and channel widths). In preferred embodiments, the width dimension D of at least the central disks on each rotor in the set is sufficient to allow the disks for each rotor to align with the inlet and/or outlet frame portions or barriers. In this manner, the same (or common) housing 720 may be employed with any one of the rotors in the set of plural rotors, without requiring adjustment to the inlet or outlet configuration.

Various improvements with respect to drive force, inlet members, moving particulate material against fluid pressure, moving fine and powdery material as described in the above-cited patents may be included in any of the above-described embodiments of the present invention. For example, embodiments may include disk surface discontinuities such as described in further detail in U.S. Pat. No. 5,355,993, incorporated herein by reference, shroud plates or other inlet enhancements as described in further detail in U.S. Pat. No. 5,485,909, incorporated herein by reference, features for enhancing the ability to transport material across a pressure differential as described in further detail in U.S. Pat. No. 5,402,876, or inlet extensions and deaeration devices as described in further detail in U.S. Pat. No. 5,497,873.

Figure 18:
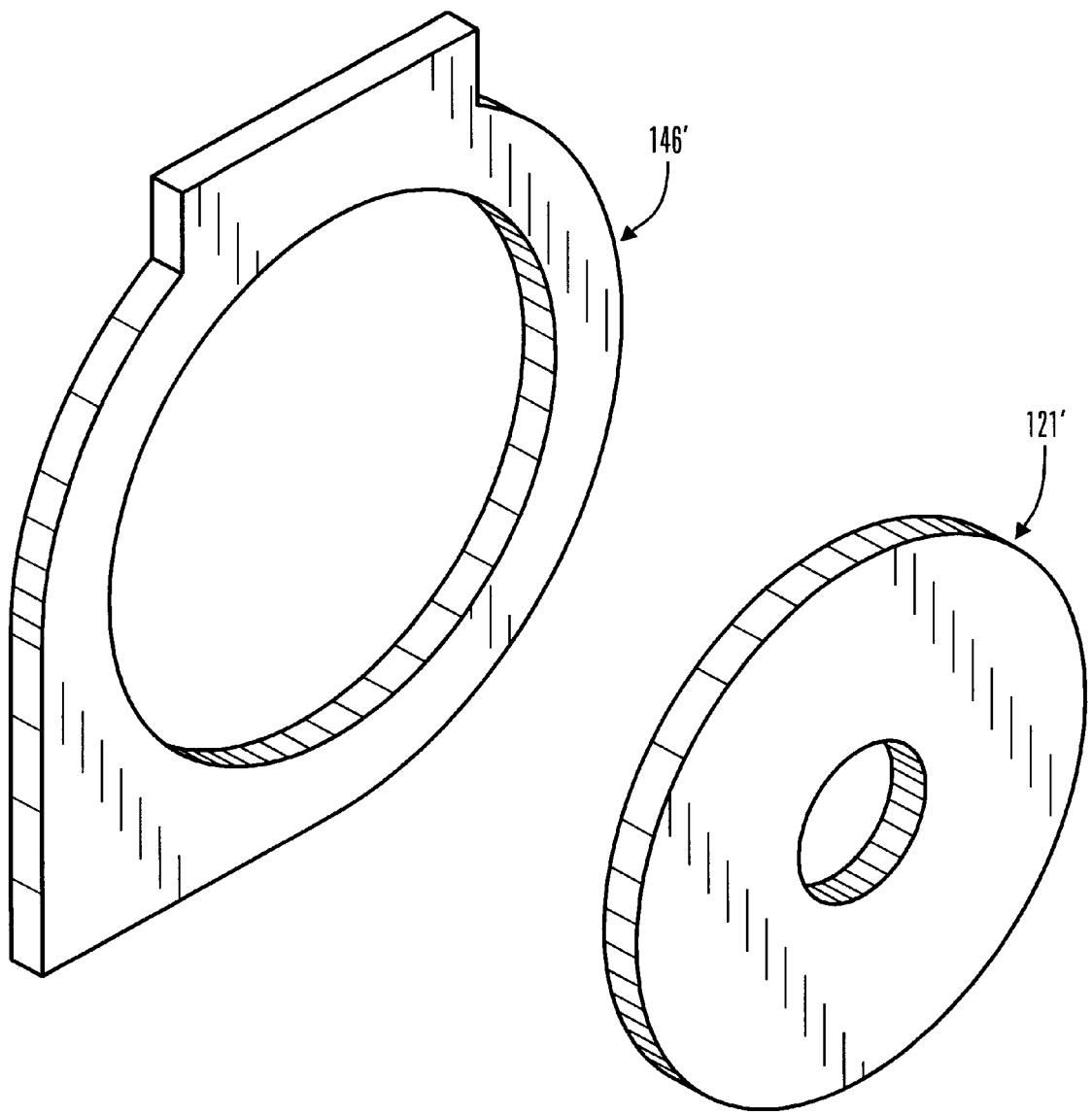
FIG. 18 is an exploded view of an end disk and a housing wall, according to a further embodiment of the invention.

While embodiments described above include housings having side walls (such as walls 146 and 147 in FIG. 5 and walls 304 and 305 in FIG. 10) which enclose the outer disks of the drive rotor within the housing interior, other embodiments may employ side walls that have circular openings for receiving the outer or end disks on of the drive rotor. More particularly, as shown in FIG. 18, a housing side wall 146' is provided with a opening, within which the end disk 121' of a drive rotor is positioned to rotate. A suitable seal is provided around the peripheral edge of the end disk, to minimize the passage of dust and debris from the interior of the housing, while allowing the disk to rotate relative to the side wall. In this embodiment, the bearing member 145 for the drive rotor shaft may be disposed outside of the housing, to minimize contamination of the bearing structure with debris and dust from the housing interior.

The transport apparatus elements described above are preferably made of high strength steel or other suitable material including, but not limited to, other suitable metals and alloys, high strength polymers, plastics, composite materials, or the like. The interior surfaces of drive disks and hubs are preferably made of an abrasion-resistant metal or other suitable material having friction or adhesion qualities to facilitate the transportation of material toward the outlet. In suitable applications, the interior stationary wall 138 may be composed of a low friction material, including, but not limited to, ultra high molecular weight polyethylene or stainless steel.

Having thus described exemplary embodiments of the present invention, it should be understood by those skilled in the art that the above disclosures are exemplary only and that various other alternatives, adaptations and modifications may be made within the scope of the present invention. The presently disclosed embodiments are to be considered in all respects as illustrative and not restrictive. The scope of the invention being indicated by the appended claims, rather than the foregoing description, and all changes which come within the meaning and range of equivalency of the claims are, therefore, intended to be embraced therein.

What is claimed is:

1. An apparatus for transporting particulate material, comprising:

a housing having an inlet for receiving particulate material, an outlet for expelling particulate material and a stationary wall extending between the inlet and the outlet; and a rotor having a plurality of disks spaced apart by hub sections and, with the stationary wall, defining a plurality of transport channels between said disks and along the stationary wall, said transport channels extending between said inlet and said outlet, said rotor supported within said housing interior for rotation relative to said housing interior;

wherein each transport channel is configured to receive particulate material from the inlet and, by rotation of the rotor, cause the particulate material to form an interlocked mass of particles which bridges across the transport channel, contacts both disks that define the transport channel and moves toward the outlet.

2. An apparatus as recited in claim 1, wherein said plurality of disks comprises no more than N adjacent disks disposed coaxial with each other, each disk having a pair of opposed disk faces and wherein said plurality of transport channels comprises no less than N–1 transport channels, each transport channel being defined between two mutually facing disk faces of two adjacent disks.

3. An apparatus as recited in claim 1, wherein at least one of said plurality of disks comprises at least one disk face defining a series of discontinuities.

4. An apparatus as recited in claim 1, wherein each of said disks has at least one disk face defining a series of discontinuities.

5. An apparatus as recited in claim 1, wherein said inlet comprises a plurality of inlet channels, each inlet channel disposed in particle flow communication with a plurality, but not all of said transport channels.

6. An apparatus as recited in claim 1, wherein said inlet comprises a plurality of inlet channels corresponding in number to said plurality of transport channels, wherein each inlet channel is disposed in particle flow communication with a respective one of said transport channels.

7. An apparatus as recited in claim 1, wherein said inlet comprises no more than one inlet channel provided in particle flow communication with said plurality of transport channels.

8. An apparatus as recited in claim 1, wherein said outlet comprises a plurality of outlet channels, each outlet channel disposed in particle flow communication with a plurality, but not all of said transport channels.

9. An apparatus as recited in claim 1, wherein said outlet comprises a plurality of outlet channels corresponding in number to said plurality of transport channels, wherein each outlet channel is disposed in particle flow communication with a respective one of said transport channels.

10. An apparatus as recited in claim 1, wherein said outlet comprises no more than one outlet channel provided in particle flow communication with said plurality of transport channels.

11. An apparatus as recited in claim 1, wherein said rotor, including said disks and hub sections, are composed of a single, unitary body.

12. An apparatus as recited in claim 2, wherein:
    said plurality of disks of said rotor comprise N separable disk-shaped members, each disk-shaped member having a central aperture through which the axis of the disk-shaped member extends;
    said hub sections of said rotor comprise a plurality of separable cylindrical members, each cylindrical member having a central aperture through which the axis of the cylindrical member extends; and
    said rotor further has a central shaft member, extending through the central apertures of said disk-shaped members and said cylindrical members and supporting said disks and hub sections in a coupled relationship with each other.

13. An apparatus as recited in claim 1, wherein the rotor defines an axial dimension and at least one of the disks on the rotor is selectively positionable at any one of plural positions along the axial length of the rotor.

14. An apparatus as recited in claim 1, wherein the inlet of the housing defines a plurality of inlet channels separated by at least one barrier and wherein each barrier aligns with a respective disk on the rotor.

15. An apparatus as recited in claim 1, wherein the outlet of the housing defines a plurality of outlet channels separated by at least one barrier and wherein each barrier aligns with a respective disk on the rotor.

16. A process for transporting particulate material, comprising:
    providing a housing having an inlet, an outlet and a stationary wall;
    supporting a rotor for rotation in the housing, wherein the rotor has a plurality of disks spaced apart by hub sections and, with the stationary wall, defines a plurality of transport channels between said disks, extending along the stationary wall, between said inlet and said outlet;
    receiving particulate material through the inlet of the housing and into the transport channels;
    rotating the rotor to transport received material through the housing toward the housing outlet; and
    receiving particulate material from the inlet and, by rotation of the rotor, causing the particulate material to form an interlocked mass of particles which bridges across the transport channel, contacts both disks that define the transport channel and moves toward the outlet.

17. A process as recited in claim 16, wherein said step of receiving particulate material comprises receiving particulate material in a plurality of separated inlet channels, wherein each inlet channel is aligned with at least one of the transport channels.

18. A process as recited in claim 16, wherein said step of receiving particulate material comprises receiving particulate material in a plurality of separated inlet channels, wherein each inlet channel is aligned with no more than one of the transport channels.

19. An apparatus as recited in claim 1, wherein said housing includes an access opening for allowing access to the housing interior for servicing, cleaning or inspection, of the transport channels.

20. An apparatus for transporting particulate material, comprising:
    a housing having an inlet for receiving particulate material and an outlet; and
    a rotor having a plurality of disks spaced apart by hub sections and defining a plurality of transport channels between said disks, said transport channels extending between said inlet and said outlet, said rotor supported within said housing interior for rotation relative to said housing interior
    wherein said housing includes an access opening for allowing access to the housing interior for servicing, cleaning or inspection, of the transport channels; and
    wherein said access opening comprises a plurality of apertures in the housing, each aperture being associated with a respective one of said plurality of transport channels for allowing access to the associated transport channel.

21. An apparatus for transporting particulate material, comprising:
    a housing having an inlet for receiving particulate material and an outlet; and
    a rotor having a plurality of disks spaced apart by hub sections and defining a plurality of transport channels between said disks, said transport channels extending between said inlet and said outlet, said rotor supported within said housing interior for rotation relative to said housing interior
    wherein said housing includes an access opening for allowing access to the housing interior for servicing, cleaning or inspection, of the transport channels; and
    wherein said access opening comprises a plurality of apertures in the housing, wherein each aperture is aligned with a respective one of said plurality of transport channels for allowing access to the associated transport channel and each aperture having an associated door for selectively opening and closing the aperture.

22. An apparatus for transporting particulate material comprising:
    a housing having a housing wall structure defining a housing interior, an inlet for receiving particulate material and an outlet for expelling particulate material and a stationary wall;
    a rotor disposed for rotation within the housing interior and defining, with the stationary wall, a plurality of transport channels, each transport channel extending along the stationary wall, between said inlet and said outlet for communicating particulate material received through the inlet toward said outlet upon rotation of the rotor;
    wherein said housing wall structure includes access means for allowing access to the housing interior for servicing, cleaning or inspection, of the transport channels; and
    wherein each transport channel is configured to receive particulate material from the inlet and, by rotation of the rotor, cause the particulate material to form an interlocked mass of particles which bridges across the transport channel, contacts both disks that define the transport channel and moves toward the outlet.

23. An apparatus as recited in claim 22, wherein said access means comprises a plurality of apertures in the housing, each aperture being associated with a respective one of said plurality of transport channels for allowing access to the associated transport channel.

24. A process as recited in claim 16, further comprising the step of accessing at least one of the transport channels through an access opening in the housing, prior to or after rotation of the rotor.

25. An apparatus as recited in claim 1, wherein the housing includes an opening adjacent at least one of said transport channels, between the inlet and the outlet, for servicing, cleaning or inspection of the rotor.

26. A process as recited in claim 16, further comprising the steps of opening an access door on the housing adjacent at least one of said transport channels, between the inlet and the outlet, for servicing, cleaning or inspection of the rotor.

27. An apparatus as recited in claim 22, wherein the access means comprises an opening adjacent at least one of said transport channels, between the inlet and the outlet, for servicing, cleaning or inspection of the rotor.

28. An apparatus as recited in claim 1, further comprising an abutment member disposed adjacent the inlet, the abutment member having a plurality of sections associated with the plurality of transport channels, each abutment section extending into a respective associated transport channel adjacent the inlet, for directing particulate material into the associated transport channel.

29. A process as recited in claim 16, further comprising the step of disposing an abutment member having a plurality of sections adjacent the inlet, with each abutment member section extending into a respective transport channel adjacent the inlet, for directing particulate material into the transport channels.

30. An apparatus as recited in claim 22, further comprising an abutment member disposed adjacent the inlet, the abutment member having a plurality of sections associated with the plurality of transport channels, each abutment section extending into a respective associated transport channel adjacent the inlet, for directing particulate material into the associated transport channel.

* * * * *